US010853231B2

United States Patent
Guenther et al.

(10) Patent No.: US 10,853,231 B2
(45) Date of Patent: Dec. 1, 2020

(54) DETECTION AND CORRECTION OF CODING ERRORS IN SOFTWARE DEVELOPMENT

(71) Applicant: SAP SE, Walldorf (DE)

(72) Inventors: Eugen Guenther, Wiesloch (DE);
Estevao Schultz-Neto, Wiesloch (DE);
Stefan Hauser, Malsch (DE); Guy Cases Langhoff, Rauenberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/216,046

(22) Filed: Dec. 11, 2018

(65) Prior Publication Data

US 2020/0183818 A1   Jun. 11, 2020

(51) Int. Cl.
*G06F 9/44* (2018.01)
*G06F 11/36* (2006.01)
*G06F 8/10* (2018.01)
*G06F 8/75* (2018.01)

(52) U.S. Cl.
CPC ............ *G06F 11/3688* (2013.01); *G06F 8/10* (2013.01); *G06F 8/75* (2013.01); *G06F 11/3664* (2013.01)

(58) Field of Classification Search
CPC ............ G06F 11/0781; G06F 11/3688; G06F 11/3664
USPC ....................................................... 717/124
See application file for complete search history.

(56) References Cited

U.S. PATENT DOCUMENTS

| | | | | |
|---|---|---|---|---|
| 6,275,223 B1 * | 8/2001 | Hughes | ................ | G06F 3/0483 715/751 |
| 7,093,235 B2 * | 8/2006 | Andrews | ............. | G06F 11/3604 714/E11.207 |
| 7,712,087 B2 * | 5/2010 | Kogan | ................ | G06F 11/3672 717/128 |
| 8,108,759 B2 * | 1/2012 | Moon | ................... | H03M 13/15 714/781 |

(Continued)

OTHER PUBLICATIONS

Robert Baggen et al.; "Standardized code quality benchmarking for improving software maintainability"; Software Qual J—May 18, 2011.*

(Continued)

*Primary Examiner* — Francisco J Aponte
(74) *Attorney, Agent, or Firm* — Klarquist Sparkman, LLP

(57) ABSTRACT

Techniques and solutions are described for automatically analyzing code for code principle violations. A code analysis can be configured that includes one or more tests for one or more code principle violations. The code analysis can be applied statically, against previously generated code, or can be conducted in a dynamic manner as code is being written or edited. Code, such as automatically generated code, can be excluded from analysis, or reports of analysis results. When a code principle violation is detected, the violation can be displayed to a user. Information regarding correcting the violation can be displayed. In some cases, a code principle violation can be automatically corrected. Code violations can be classified, such as by severity, and can be associated with particular code, such as code packages or objects, or particular developers or development groups. Reports can be prepared summarizing changes in code principle violations over time.

20 Claims, 19 Drawing Sheets

| Unit | APO | Issues Total | Issues Without Generated Code | Statements Total | Statements Generated | Statements Without Generated Code | Clean Code | Bad Code |
|---|---|---|---|---|---|---|---|---|
| FI | Estevao_X231A | 309 | 112 | 1,734 | 1,104 | 630 | 82.18% | 17.82% |
| | Eugen_B212C | 34 | 34 | 148 | 0 | 148 | 77.03% | 22.97% |
| | Stefan_H7362F | 221 | 221 | 3,384 | 0 | 3,384 | 93.47% | 6.53% |
| | Guy_IK23M | 878 | 878 | 11,678 | 0 | 11,678 | 92.48% | 7.52% |
| | Ina_N872Z | 4 | 4 | 4,724 | 0 | 4 | 0.00% | 100.00% |
| | Karla_V5821G | 662 | 271 | 8,733 | 5,155 | 3,578 | 92.42% | 7.58% |
| | Sunjay_J9912U | 15 | 15 | 53 | 0 | 53 | 71.70% | 28.30% |
| | Greg_H1927I | 82 | 9 | 4,581 | 4,072 | 509 | 98.21% | 1.79% |
| LI | Kristina_T23120 | 720 | 720 | 9,512 | 0 | 9,512 | 92.43% | 7.57% |
| | Estevao_X231A | 140 | 140 | 1,332 | 0 | 1,332 | 89.49% | 10.51% |
| | Wolfgang_E1125S | 8 | 720 | 0 | 0 | 0 | 736 | 740 |
| SI | Stefan_H7362F | 58 | 58 | 163 | 0 | 163 | 64.42% | 35.58% |

(56) References Cited

U.S. PATENT DOCUMENTS

| | | | | |
|---|---|---|---|---|
| 8,225,302 | B2* | 7/2012 | Waugh | G06F 11/3616 |
| | | | | 717/122 |
| 8,356,278 | B2* | 1/2013 | Drissi | G06F 8/36 |
| | | | | 717/101 |
| 8,365,148 | B2* | 1/2013 | Millmore | G06F 8/20 |
| | | | | 717/124 |
| 8,661,415 | B2* | 2/2014 | Fanning | G06F 11/3612 |
| | | | | 717/127 |
| 8,762,950 | B2* | 6/2014 | Beasley | G06F 11/3604 |
| | | | | 717/124 |
| 8,839,211 | B2* | 9/2014 | Kaulgud | G06F 8/77 |
| | | | | 717/131 |
| 8,990,764 | B2* | 3/2015 | Armstrong | G06F 8/30 |
| | | | | 717/100 |
| 9,081,595 | B1* | 7/2015 | Delarue | G06F 9/44589 |
| 9,235,493 | B2* | 1/2016 | Goetsch | G06F 11/3604 |
| 9,235,494 | B2* | 1/2016 | Gautam | G06F 11/3616 |
| 9,268,665 | B2* | 2/2016 | Barrow | G06F 8/77 |
| 9,354,867 | B2* | 5/2016 | Jain | G06F 8/70 |
| 9,389,984 | B2* | 7/2016 | Chockler | G06F 11/3616 |
| 9,405,662 | B2* | 8/2016 | Ivankovic | G06F 11/3676 |
| 9,411,578 | B2* | 8/2016 | Henriksen | G06F 8/77 |
| 9,465,609 | B2* | 10/2016 | Balasubramanian | G06F 8/30 |
| 9,535,821 | B1* | 1/2017 | Delarue | G06F 9/44589 |
| 9,619,363 | B1* | 4/2017 | Chitale | G06F 11/3684 |
| 9,645,817 | B1* | 5/2017 | van Schaik | G06F 11/3604 |
| 9,658,907 | B2* | 5/2017 | Rodmell | G06F 11/008 |
| 9,690,690 | B1* | 6/2017 | Henriksen | G06F 11/3692 |
| 9,870,306 | B2* | 1/2018 | Chandra | G06F 11/3664 |
| 10,095,602 | B2* | 10/2018 | Gautam | G06F 11/3616 |
| 10,152,403 | B2* | 12/2018 | Kraft | G06F 8/77 |
| 10,175,975 | B2* | 1/2019 | Kolesnik | G06F 8/71 |
| 10,289,532 | B2* | 5/2019 | Jain | G06F 11/3676 |
| 10,338,986 | B2* | 7/2019 | Grealish | G06F 11/0775 |
| 10,360,140 | B2* | 7/2019 | Shor | G06F 11/3616 |
| 10,423,410 | B1* | 9/2019 | Goyal | G06F 8/77 |
| 10,452,525 | B2* | 10/2019 | Farchi | G06F 11/3688 |
| 10,482,000 | B2* | 11/2019 | Vikjord | G06F 11/362 |
| 10,664,382 | B2* | 5/2020 | Jose | G06F 11/3604 |
| 2007/0044075 | A1* | 2/2007 | Koning | G06F 8/70 |
| | | | | 717/122 |
| 2008/0270989 | A1* | 10/2008 | Ahadian | G06F 8/33 |
| | | | | 717/126 |
| 2009/0070734 | A1* | 3/2009 | Dixon | G06F 8/71 |
| | | | | 717/102 |
| 2009/0287729 | A1* | 11/2009 | Chen | G06F 11/3676 |
| 2010/0023928 | A1* | 1/2010 | Hentschel | G06F 11/3604 |
| | | | | 717/124 |
| 2010/0211932 | A1* | 8/2010 | Jones | G06F 8/20 |
| | | | | 717/124 |
| 2010/0251027 | A1* | 9/2010 | Yawalkar | G06F 11/3616 |
| | | | | 714/38.14 |
| 2011/0022551 | A1* | 1/2011 | Dixon | G06F 11/3616 |
| | | | | 706/12 |
| 2013/0124927 | A1* | 5/2013 | Balko | G06F 11/3604 |
| | | | | 714/48 |
| 2013/0152043 | A1* | 6/2013 | Kuzmin | G06F 8/72 |
| | | | | 717/110 |
| 2013/0198800 | A1* | 8/2013 | Bezilla | G06F 21/552 |
| | | | | 726/1 |
| 2013/0305224 | A1* | 11/2013 | Eade | G06F 8/20 |
| | | | | 717/126 |
| 2014/0047265 | A1* | 2/2014 | Das | G06F 11/1666 |
| | | | | 714/6.11 |
| 2015/0135166 | A1* | 5/2015 | Tarlow | G06F 11/3604 |
| | | | | 717/125 |
| 2016/0034334 | A1* | 2/2016 | Sadovsky | G06F 11/324 |
| | | | | 714/57 |
| 2016/0054983 | A1* | 2/2016 | Balasubramanian | G06F 8/30 |
| | | | | 717/113 |
| 2016/0342451 | A1* | 11/2016 | Ly | G06F 11/0769 |
| 2017/0024269 | A1* | 1/2017 | Shuvali | G06F 11/0706 |
| 2017/0147336 | A1* | 5/2017 | Medlyn | G06F 11/3676 |
| 2017/0235662 | A1* | 8/2017 | Leask | G06F 11/30 |
| | | | | 717/125 |
| 2017/0235664 | A1* | 8/2017 | Henriksen | G06F 8/433 |
| | | | | 717/122 |
| 2017/0293546 | A1* | 10/2017 | Frontiero | G06F 11/36 |
| 2018/0121329 | A1* | 5/2018 | Lo | G06F 11/302 |
| 2018/0173610 | A1* | 6/2018 | Lee | G06F 11/00 |
| 2018/0276562 | A1* | 9/2018 | Woulfe | G06F 11/3668 |
| 2018/0300227 | A1* | 10/2018 | Bergen | G06F 11/3688 |
| 2019/0042369 | A1* | 2/2019 | Deutsch | G06F 3/0673 |
| 2019/0108001 | A1* | 4/2019 | Hauser | G06F 11/3604 |
| 2019/0121636 | A1* | 4/2019 | Neatherway | G06F 11/3692 |
| 2019/0361795 | A1* | 11/2019 | Cole | G06T 11/206 |

OTHER PUBLICATIONS

Patrick Knab et al.; "Predicting Defect Densities in Source Code Files with Decision Tree Learners"; MSR'06, May 22-23, 2006, Shanghai, China.*

Dowey, "How to Reduce the Technical Debt of Custom ABAP Code," IntelliCorp Blog, Nov. 1, 2017, 15 pages.

"Code Inspector" SAP, retrieved from: https://help.sap.com/saphelp_nwpi71/helpdata/en/8d/4b64488cce3945ba42b059319d62dc/content.htm?no_cache=true, at least as early as May 11, 2020, 2 pages.

"SAP Code Inspector (SCI) Tutorial," retrieved from https://blogs.sap.com/2011/02/11/sap-code-inspector-sci-tutorial/, Feb. 11, 2011, 14 pages.

"Code Inspector" SAP Help Portal, retrieved from: https://help.sap.com/viewer/ba879a6e2ea04d9bb94c7ccd7cdac446/7.51.6/en-US/49205531d0fc14cfe10000000a42189b.html, at least as early as May 11, 2020, 7 pages.

"Evaluating the Quality of Your ABAP with Code Inspector—Part 2," retrieved from: https://itpsap.com/evaluating-quality-abap-code-inspector-part-2/, Jun. 15, 2014, 10 pages.

ABAP Test Cockpit (ATC) Introduction and Steps, retrieved from: https://sapyard.com/abap-test-cockpitatc-introduction-and-steps/, Aug. 6, 2017, 11 pages.

Li, "Integrate ATC(ABAP Test Cockpit) or Code Inspector check with ChaRM," retrieved from: https://blogs.sap.com/2015/07/12/integrate-atcabap-test-cockpit-or-code-inspector-check-with-charm/, Jul. 12, 2015, 10 pages.

Dolinskaja, "Getting Started with the ABAP Test Cockpit for Developers," retrieved from: https://blogs.sap.com/2012/10/18/getting-started-with-the-abap-test-cockpit-for-developers/, Oct. 18, 2012, 15 pages.

Deliver SAP Updates 85% Faster with 100% Risk Coverage, Tricentis Live Compare, retrieved from: https://www.tricentis.com/products/livecompare-impact-analysis-sap/, at least as early as May 11, 2020, 11 pages.

* cited by examiner

| Unit | Issues Total | Issues Without Generated Code | Statements Total | Statements Generated | Statements Without Generated Code | Clean Code | Bad Code |
|---|---|---|---|---|---|---|---|
| FI | 2,205 | 1,454 | 30,315 | 10,331 | 19,984 | 92.73% | 7.27% |
| LI | 868 | 868 | 10,844 | 0 | 10,844 | 92.00% | 8.00% |
| SI | 58 | 58 | 163 | 0 | 163 | 64.42% | 35.58% |

FIG. 6

| Unit | APO | Issues Total | Issues Without Generated Code | Statements Total | Statements Generated | Statements Without Generated Code | Clean Code | Bad Code |
|---|---|---|---|---|---|---|---|---|
| FI | Estevao_X231A | 309 | 112 | 1,734 | 1,104 | 630 | 82.18% | 17.82% |
| | Eugen_B212C | 34 | 34 | 148 | 0 | 148 | 77.03% | 22.97% |
| | Stefan_H7362F | 221 | 221 | 3,384 | 0 | 3,384 | 93.47% | 6.53% |
| | Guy_IK23M | 878 | 878 | 11,678 | 0 | 11,678 | 92.48% | 7.52% |
| | Ina_N872Z | 4 | 4 | 4 | 0 | 4 | 0.00% | 100.00% |
| | Karla_V5821G | 662 | 271 | 8,733 | 5,155 | 3,578 | 92.42% | 7.58% |
| | Sunjay_J9912U | 15 | 15 | 53 | 0 | 53 | 71.70% | 28.30% |
| | Greg_H19271 | 82 | 9 | 4,581 | 4,072 | 509 | 98.21% | 1.79% |
| LI | Kristina_T23120 | 720 | 720 | 9,512 | 0 | 9,512 | 92.43% | 7.57% |
| | Estevao_X231A | 140 | 140 | 1,332 | 0 | 1,332 | 89.49% | 10.51% |
| | Wolfgang_E1125S | 8 | 4 | 0 | 0 | 0 | 736 | 740 |
| SI | Stefan_H7362F | 58 | 58 | 163 | 0 | 163 | 64.42% | 35.58% |

FIG. 7

| Unit | APO | PO | Package | Object Name | Issues Total | Issues Without Generated Code | Statements Total | Statements Generated | Statements Without Generated Code | Clean Code | Bad Code |
|---|---|---|---|---|---|---|---|---|---|---|---|
| FI | Estevao | Stefan | MODJJ_BOOT | CL_FITAXCN_INVC_DPC | 223 | 2 | 1,114 | 1,104 | 10 | 82.18% | 17.82% |
|  |  |  |  | CL_FITAXCN_INVC_DPC_EXT | 25 | 25 | 213 |  | 213 | 77.03% | 22.97% |
|  |  |  |  | CL_FITAXCN_INVC_MPC_EXT | 13 | 13 | 209 |  | 209 | 93.47% | 6.53% |
|  |  |  |  | DOSJP_DUEDATE | 11 | 11 | 45 |  | 45 | 92.48% | 7.52% |
|  | Guy |  | VIS_QUERY | DOS_CHNG_JP | 1 | 1 |  |  |  | 0.00% | 100.00% |
|  |  |  |  | LVJP_BUPA_JP_DDS | 6 | 6 | 44 |  | 44 | 92.42% | 7.58% |

FIG. 8

| PO | Package | Object Name | ABAP Unit Test Passed CL_LEGACY | Conventions | Append Entries to Sorted Table CL_APP_SRT | Pretty Printer State CL_P_PRINT | SY-SUBRC Handling CL_SYSUBRC | Comment Metrics CL_CMNT | Copy CL_CPY |
|---|---|---|---|---|---|---|---|---|---|
| Eugen | ODATA_FIXCIN_ACCOUNT_MGMT | CL_FITAXCN_INVC_DPC | 1 |  |  | 205 |  | 9 |  |
|  |  | CL_FITAXCN_INVC_DPC_EXT |  |  |  | 1 |  | 9 |  |
|  |  | CL_FITAXCN_INVC_MPC_EXT |  |  |  | 1 |  | 8 |  |
| Stefan | GLO_FIN_BP_DDS_JP | DDSJP_DUEDATE |  |  |  | 5 |  | 4 |  |
|  |  | DDS_CHNG_JP |  | 3 |  | 5 |  |  |  |
|  |  | LVJP_BUPA_JP_DDS |  |  |  | 1 |  | 1 |  |
|  | ODATA_PROPERTY_TAX_REPORT | CL_FDP_COVER_DPC_EXT |  |  |  | 1 | 1 | 3 |  |
|  |  | CL_FDP_ITEM_DPC_EXT |  |  |  |  |  |  |  |
|  |  | CL_KJRTA01_ALLAS | 1 |  |  |  |  | 8 |  |

FIG. 9

Class Builder: Display Class ZCL_CI_TEST_COUNT_NESTED

Class/Interface: ZCL_CI_TEST_COUNT_NESTED   Implemented/ Active

Properties / Interfaces / Friends / Attributes / Methods / Events / Types / Aliases

| Method | Level | Visibility | M... | Description |
|---|---|---|---|---|
| IF_CI_TEST~QUERY_ATTRIBUTES | Instance Method | Public | | Query Attributes |
| IF_CI_TEST~NAVIGATE | Instance Method | Public | | Navigate |
| IF_CI_TEST~DISPLAY_DOCUMENTATION | Instance Method | Public | | Display documentation |
| IF_CI_TES~EXCEPTION | Instance Method | Public | | Declare Exception |
| GET_QUICKFIX_DESCRIPTION | Instance Method | Public | | |
| CLEAR | Instance Method | Public | | Reset for new object |
| CONSOLIDATE_FOR_DISPLAY | Instance Method | Public | | Consolidation of Statistics for Results Display |
| GET_ATTRIBUTES | Instance Method | Public | | Get attributes |
| GET_MESSAGE_TEXT | Instance Method | Public | | Get text for messages |
| GET_MESSAGE_TITLE | Instance Method | Public | | Get title (text without parameters_ for a message |
| GET_MESSAGE_PCOMS | Instance Method | Public | | Get possible pseudo comments for a message |
| GET_RESULT_NODE | Instance Method | Public | | Create node for result |
| MODIFY_PRIORITIES | Instance Method | Public | | Modifies customizing priorities |
| PUT_ATTRIBUTES | Instance Method | Public | | Set Properties |
| RUN | Instance Method | Public | | Perform Analysis |
| RUN_BEGIN | Instance Method | Public | | Operation before analysis |
| RUN_END | Instance Method | Public | | Operation after analysis |
| GET_DETAIL | Instance Method | Public | | Get the detail information |
| GET_DETAIL_TEXT | Instance Method | Public | | Get detail information in text form |
| GET_DETAIL_SINGLE | Instance Method | Public | | Get detail information in text form for single attributes |
| GET_DETAIL_NAMES | Instance Method | Public | | |
| VERIFY_TEST | Instance Method | Public | | Verify a test |
| GET_EXAMPLES | Instance Method | Public | | Get example test cases |
| CHECK_DESTINATION | Instance Method | Public | | Check the RFC destination |
| GET_VAR_ENTRY | Instance Method | Public | | |
| GET_MESSAGE_CATEGORY | Instance Method | Public | | Get category of a message |
| IS_CHECK_SCOPE_ENABLED | Instance Method | Public | | Is the test SCA-classification-enabled? |
| GET_DOCU_FOR_TEST | Instance Method | Public | | Get the documentation text |
| ADD_OBJ_TYPE | Instance Method | Public | | Add registration for object category |
| CHECK_CHECKSUM | Instance Method | Public | | Checks the check sum |
| CHECKS_FOR_REMOTE_TEST | Instance Method | Public | | Prechecks for remote tests |
| GET_CHECKSUM_FROM_DBTAB | Instance Method | Public | | Get the check sum for remote tests |
| GET_LOCAL_CHECKSUM | Instance Method | Public | | Specify Check Sum |
| GET | Instance Method | Public | | Load information for test run ('X' if successful) |
| HAS_CHECK_SCOPE | Instance Method | Public | | |
| INFORM | Instance Method | Public | | Results message, synchronize with exceptions |
| ADD_DETAILS | Instance Method | Public | | |
| EXPORT_TO_XSTRING | Instance Method | Public | | |
| EXPORT_TMP_INFOS | Instance Method | Public | | Exports temporary information |

FIG. 10

```
class ZCL_CI_TEST_COUNT_NESTED definition
public inheriting from CL_CI_TEST_SCAN final
create public.

public section.
  methods CONSTRUCTOR .
  methods RUN
    redefinition .
protected section.

methods GET_STMNT_NAME
  importing
    !P_STMNT_TYPE type STMNT_TYPE
  returning
    value(P_STMNT_NAME) type CHAR20 .
methods IS_LOOP_AT_GROUP
  importing
    !STMNT_FROM type STRU_FROM1
  returning
    value(IS_LOOP_AT_GROUP) type FLAG .
private section.
  constants MCODE_0001 type SCI_ERRC value '0001' ##NO_TEXT.
  constants MCODE_0002 type SCI_ERRC value '0002' ##NO_TEXT.
  constants MCODE_0003 type SCI_ERRC value '0003' ##NO_TEXT.
ENDCLASS.
```

FIG. 11A

```
CLASS ZCL_CI_TEST_COUNT_NESTED IMPLEMENTATION.

* <SIGNATURE>---------------------------------------------------------------+

* | Instance Public Method ZCL_CI_TEST_COUNT_NESTED->CONSTRUCTOR

* +--------------------------------------------------------------------+

* +--------------------------------------------------------------------</SIGNATURE>

METHOD constructor.
    super->constructor( ).
    description = 'Count Nested' (000).
    category    = 'ZCL_CI_TEST_CLEAN_CODE'.
    position    = '330'.
    version     = '000'.
    add_obj_type( c_type_program ).

me->has_documentation = abap_true.
    me->uses_checksum = abap_true.
    me->remote_enabled = abap_true.
    me->remote_rfc_enabled = abap_true.
    me->check_scope_enabled = abap_true.
    meta_data=>add_my_rules(
      EXPORTING   i_my_name =   me->myname
      CHANGING    p_rules =    me->scimessages ).
  ENDMETHOD.
```

FIG. 11B

```
* <SIGNATURE>---------------------------------------------------------+

* | Instance Protected Method ZCL_CI_TEST_COUNT_NESTED->GET_STMNT_NAME

* +--------------------------------------------------------------------+

* | [--->] P_STMNT_TYPE            TYPE      STMNT_TYPE

* | [<-()] P_STMNT_NAME            TYPE      CHAR20

* +-------------------------------------------------------</SIGNATURE> method GET_STMNT_NAME.
  case p_stmnt_type.
    when 'D'. p_stmnt_name = 'DO/ENDDO'.
    when 'W'. p_stmnt_name = 'WHILE/ENDWHILE'. when 'L'. p_stmnt_name = 'LOOP/ENDLOOP'.
    when 'V'. p_stmnt_name = 'PROVIDE/ENDPROVIDE'.
    when 'S'. p_stmnt_name = 'SELECT/ENDSELECT'.
    when others. p_stmnt_name = `STRUCTURE OF TYPE: ` && p_stmnt_type.
  endcase.
endmethod.              "

* <SIGNATURE>---------------------------------------------------------+

* | Instance Protected Method ZCL_CI_TEST_COUNT_NESTED->IS_LOOP_AT_GROUP

* +--------------------------------------------------------------------+

* | [--->] STMNT_FROM              TYPE      STRU_FROM1

* | [<-()] IS_LOOP_AT_GROUP        TYPE      FLAG

* +-------------------------------------------------------</SIGNATURE> method IS_LOOP_AT_GROUP.
  is_loop_at_group = abap_false.
  read table ref_scan->statements into data(stmnt) index stmnt_from.
  if sy-subrc <> 0.
    return.
  endif.
  read table ref_scan->tokens into data(token)
    index stmnt-from.
  if sy-subrc = 0 and token-str = 'LOOP'.
    read table ref_scan->tokens into token
      index stmnt-from + 1.
    if sy-subrc = 0 and token-str = 'AT'.
      read table ref_scan->tokens into token
        index stmnt-from + 2.
      if sy-subrc = 0 and token-str = 'GROUP'.
        is_loop_at_group = abap_true.
        return.
      endif.
    endif.
  endif.
endmethod.
```

FIG. 11C

```
* <SIGNATURE>----------------------------------------------------------------+

* | Instance Public Method ZCL_CI_TEST_COUNT_NESTED->RUN

* +----------------------------------------------------------------------------+

* +------------------------------------------------------------------</SIGNATURE>

METHOD run.
  DATA: l_structure_wb LIKE structure_wa.
  DATA: l_back_ndx    LIKE structure_wa-back.
  DATA: l_include TYPE sobj_name,
    l_line    TYPE token_row,
    l_column  TYPE token_col,
    l_code    TYPE sci_errc.
  DATA: l_param_1 TYPE c LENGTH 20.
  DATA: l_param_2 TYPE c LENGTH 20.
  DATA: l_inner_loop_has_been_blamed TYPE abap_bool,
    l_inner_stmnt_ndx        TYPE i,
    l_outer_stmnt_ndx        TYPE i,
    l_stmnt_hash             TYPE sci_crc64.
  DATA: lv_count_nested TYPE int4,
    lv_kind      TYPE sychar01.

CHECK program_name IS NOT INITIAL.
  IF ref_scan IS INITIAL.
    CHECK get( ) = 'X'.
  ENDIF.
  CHECK ref_scan->subrc = 0.
  LOOP AT ref_scan->structures INTO structure_wa
   WHERE type      = scan_struc_type-iteration
     AND stmnt_type CO c_struc_type_iteration-without_select
     AND back      > 1.
   l_inner_stmnt_ndx = structure_wa-stmnt_from.
   l_back_ndx = structure_wa-back.
   l_inner_loop_has_been_blamed = abap_false.

WHILE l_back_ndx > 1 AND abap_true <> l_inner_loop_has_been_blamed.
      READ TABLE ref_scan->structures INTO l_structure_wb INDEX l_back_ndx.
      IF 0 <> sy-subrc.
        l_back_ndx = 0.
        EXIT. " while
      ELSE.
        l_back_ndx = l_structure_wb-back.
      ENDIF.
      IF NOT ( l_structure_wb-type = scan_struc_type-iteration AND
        l_structure_wb-stmnt_type CO c_struc_type_iteration-with_select ).
        CONTINUE.
      ENDIF.

READ TABLE ref_scan->statements INTO statement_wa INDEX structure_wa- stmnt_from.
      l_outer_stmnt_ndx = structure_wa-stmnt_from.
      l_include = get_include( p_level = statement_wa-level ).
      l_line    = get_line_abs(statement_wa-from ).
      l_column  = get_column_abs( statement_wa-from ).
```

FIG. 11D

```
* -- differ rule code by type of outer loop
* -
- LOOP in LOOP or LOOP in SELECT can be considered to be more serrious than other nested elements IF structure_wa-stmnt_type = 'L'.
        CASE l_structure_wb-stmnt_type.
          WHEN c_struc_type_iteration-with_select-loop.
            " LOOP AT GROUP is ok
            IF is_loop_at_group( structure_wa-stmnt_from ) = abap_true.
              CONTINUE.
            ENDIF.
            l_code = c_rule-loop_in_loop.
          WHEN c_struc_type_iteration-with_select-select.
            l_code = c_rule-loop_in_select.
          WHEN OTHERS.
            l_code = c_rule-loop_in_x.
        ENDCASE.
      ELSE.
        l_code = c_rule-loop_in_x.
      ENDIF.
      l_param_1 = get_stmnt_name( structure_wa-stmnt_type ).
      l_param_2 = get_stmnt_name(l_structure_wb-stmnt_type ).
      CLEAR l_stmnt_hash.
      get_stmt_checksum(
        EXPORTING  p_position = l_inner_stmnt_ndx
          p_version = 1
          p_stmt_range = c_inner_range
        CHANGING   p_checksum = l_stmnt_hash
        EXCEPTIONS OTHERS = 1 ).
      IF ( 0 EQ sy-subrc ).
        get_stmt_checksum(
          EXPORTING  p_position = l_outer_stmnt_ndx
            p_version = 1p_stmt_range = c_outer_range
          CHANGING   p_checksum = l_stmnt_hash EXCEPTIONS OTHERS = 1 ).
      ENDIF.
      ADD 1 TO lv_count_nested.
      IF ( lv_count_nested > 1 ).
        lv_kind = c_error.
      ELSE.
        lv_kind = c_warning.
      ENDIF.
      IF ( 0 EQ sy-subrc ).
        inform(   p_test       = me->myname
          p_code        = l_code
          p_kind        = lv_kind
          p_checksum_1  = l_stmnt_hash-i1
          p_sub_obj_type = c_type_include
          p_sub_obj_name = l_include
          p_position    = structure_wa-stmnt_from
          p_line        = l_line
          p_column      = l_column
          p_param_1     = l_param_1
          p_param_2     = l_param_2
          p_inclspec    = ' ' ).
        l_inner_loop_has_been_blamed = abap_true.
      ENDIF.
    ENDWHILE.
  ENDLOOP.
ENDMETHOD.
ENDCLASS.
```

FIG. 11E

```
METHOD constructor.
  super->constructor( ).
  description = 'New CXD Category'.
  category = 'CL_CI_CATEGORY_TOP(00I).
  position ='999'.
ENDMETHOD.
```

FIG. 12A

```
METHOD constructor.
  super-> constructor( ).
  description = 'Search for SDN'(001).
  category = 'ZCL_CI_CCD_CATEGORY'.
  version = '000'.
  has_attributes = c_false.
  attributes_ ok = c_false.
ENDMETHOD CONSTRUCTOR
```

FIG. 12B

```
METHOD run.
* Based on CL_CI_ TEST_FREE_SEARCH->RUN
DATA:  |_include TYPE sobj...name,
       |_line    TYPE token_row,
       |_column TYPE token_col,
       |_tokennr LIKE statement_ wa-from,
       |_errcnt  TYPE sci_errcnt,
       |_cocle   TYPE sci_errc,
       |_position TYPE I,
       |_param_1 TYPE string.
* Get a scan
IF ref_scan IS INITIAL.
  CHECK get() = 'X'.
ENDIF.

CHECK ref_scan-> subrc = 0.
|_errcnt = 0.

* Loop at all tokens

LOOP AT ref_scan->statements INTO statement_wa.
  CHECK statement_wa-from <= statement_ wa-to.
  |_position = sy-tabix.
  LOOP AT ref_scan->tokens INTO token_wa.
    FROM statement_wa-from TO statement_wa-to.
    |_tokennr = sy-tabix.
* Search for SDN strinq
    IF token_wa-str CS c_sdn.
      |_include = get_include().
      |_line = qet_line_abs(|_tokennr).
      |_column = qet_column_abs( |_tokennr).
      I_errcnt = I_errcnt + 1.
      |_code = '0001'.
      |_param_ 1 = |_line.
      inform(p_sub_obj_type = c_type_include
        p_sub_obj_name = |_include
        p_position = |_position
        p_line = |_line
        p_column = |_column
        p errcnt = |_errcnt
        p_kind = c_note
        p_test = c_my_name
        p_code = I_code
        p_param_1 = |_param_1).
      EXIT.
    ENDIF.
  ENDLOOP.
ENDLOOP.
ENDMETHOD.
```

FIG. 12C

DETECTION AND CORRECTION OF CODING ERRORS IN SOFTWARE DEVELOPMENT

FIELD

The present disclosure generally relates to facilitating development and testing of computer program code. Particular implementations provide automated or semi-automated detection of code principle violations.

BACKGROUND

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

Poor coding practices can contribute to the introduction of bugs or performance issues. Poor coding practices can also make it more difficult to locate and correct bugs or the source of performance issues. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for automatically analyzing code for code principle violations. A code analysis can be configured that includes one or more tests for one or more code principle violations. The code analysis can be applied statically, against previously generated code, or can be conducted in a dynamic manner as code is being written or edited. Code, such as automatically generated code, can be excluded from analysis, or reports of analysis results. When a code principle violation is detected, the violation can be displayed to a user. Information regarding correcting the violation can be displayed. In some cases, a code principle violation can be automatically corrected. Code violations can be classified, such as by severity, and can be associated with particular code, such as code packages or objects, or particular developers or development groups. Reports can be prepared summarizing changes in code principle violations over time.

A method is provided for analyzing source code to determine code principle violations. A code analysis request is received. The code analysis request specifies code to be analyzed for code principle violations and an identifier of at least one test to be applied to the specified code. The specified code is retrieved. The at least one test is retrieved. The at least one test specifies operations to detect one or more code principle violations. The operations are executed on the specified code.

One or more code principle violations are determined in the specified code, during the executing. The one or more code principle violations are compared with a classification schema. The classification schema includes a plurality of classifications and criteria for meeting a classification of the plurality of classifications. One or more code principle violations are associated with a classification of the classification schema. An indication is output for display of the one or more code principle violations and an association of the one or more code principle violations with the assigned classification.

According to another embodiment, a method is provided that can be carried out by a code analysis system. Identifiers are provided for a plurality of code principles checks that may be included in a code analysis. First input is received selecting one or more identifiers identifying code principle checks to be included in a first code analysis. The first code analysis is stored. A request is received to execute the first code analysis. The stored first code analysis is retrieved. A specification of code to be analyzed using the first code analysis is received. The specified code is retrieved. At least a portion of the specified code is analyzed according to code principle checks indicated by the first input to generate analysis results. The analysis results are output for display.

In a further embodiment, a method is provided to perform a code analysis, such as a dynamic, or online analysis. A plurality of tokens in a programming language are sequentially received. At least a portion of the plurality of tokens are stored in a buffer. It is determined that one or more of the plurality of tokens are associated with a code principle compliance test. It is determined that one or more of the plurality of tokens violate the code principle compliance test. An indication is output for display that the plurality of tokens violate the code principle compliance test.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 6 illustrates example code analysis results, organized by development unit.

FIG. 7 illustrates example code analysis results, organized by development unit and code package.

FIG. 8 illustrates example code analysis results, organized by package and package object.

FIG. 9 illustrates example code analysis results, organized by package and package object, and including results of individual tests in a code analysis.

FIG. 10 is an example class listing for an example test class that examines code for nested loops.

FIGS. 11A-11E are example ABAP source code for implementing certain methods of the class of FIG. 10.

FIGS. 12A-12C are example ABAB source code for registering new tests with a code analyzer.

DETAILED DESCRIPTION

Example 1—Overview

Figure 1:
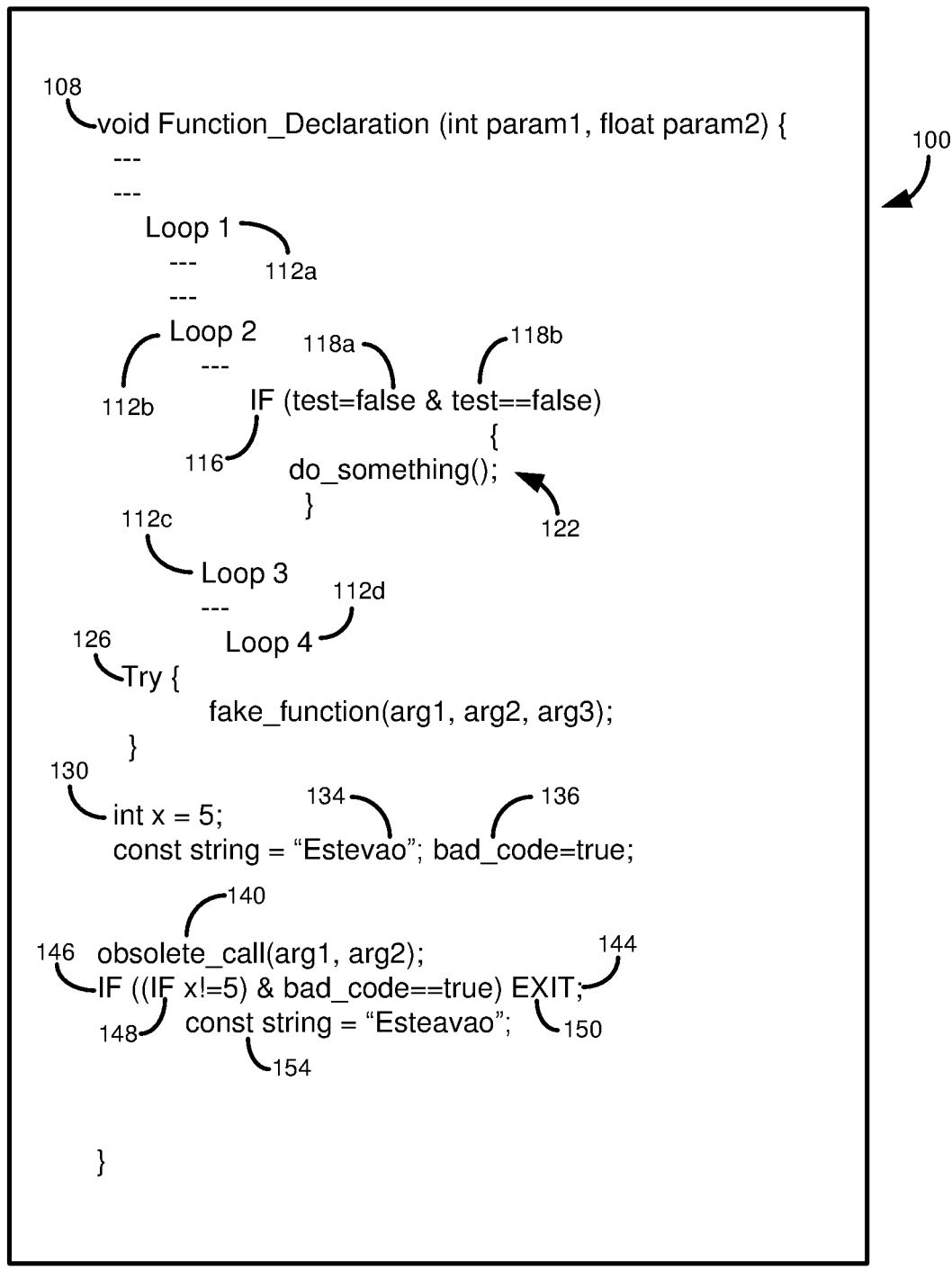
FIG. 1 presents example mock software code illustrating types of code principle violations.

Software is ubiquitous in today's society. Software is being incorporated into an increasing number of devices, developed and improved for an ever-increasing number of applications, and is growing ever more complex. Determining and correcting the source of software errors or performance issues, commonly referred to as debugging, remains a major problem in software development. Several studies have estimated that debugging consumes over fifty percent of software development time and costs.

Poor coding practices can contribute to the introduction of bugs or performance issues. Poor coding practices can also make it more difficult to locate and correct bugs or the source of performance issues. As an example, good coding practice may include practices such as commenting code, limiting the number of lines of code in a program module (e.g., a particular repository object, function, method, etc.). Although code that is not commented, or is poorly commented, may not itself give rise to a bug, it can make it harder to identify the source of a bug, and may make it more likely that a bug will be introduced. That is, for example, if a developer does not fully understand the function of particular code, the developer may modify the code, add to the code, or use the code (e.g., calling a method provided by the code) in a way that produces an error or undesirable results.

As used herein, a bug refers to code behavior that produces unintended or undesirable behavior. Bugs can result from failure to follow the correct syntax of a programming language. Bugs can also result from improper code semantics or code design, such as mathematical operator errors (e.g., division by zero), variables that may go out of bounds (e.g., a variable that causes an array to go out of bounds), memory leaks, security flaws, or bugs that result from improper interaction of software modules or components. Categories of bugs can include arithmetic errors, logic errors, syntax errors, resource errors, threading errors, interface errors, or errors resulting from the interaction of different programmers. Bugs can be associated with these and other types. In some cases, error messages or codes, including error messages from exception handling routines, can provide an indication of a bug, including its type and possible information as to its cause.

As used herein, a "code principle violation" refers to code that violates one or more coding standards. Coding standards may be those promulgated by a coding organization, a particular entity (e.g., a company, a software development company, or an individual software developer), generally accepted coding practices, or other sources. In at least some cases, a code principle violation does not, by itself, qualify as a bug or an incorrect expression in a programming language. Code can give rise to a code principle violation even if the code is completely compliant with requirements for a language, such as proper tokens and syntax.

As an example, code principles may suggest particular code formatting (e.g., indentations, number of characters per line, not repeating large sections of code, including comments at various places). However, merely failing to comment or properly indent code typically will not give rise to a bug or performance issue. A compiler, for instance, ignores comments and formatting, and so code produced from code having no comments and "bad" formatting will be expected to be the same as code produced from well commented and formatted code. Other code principles may give rise to a bug, a security risk, or other problem, at least under some scenarios. For instance, use of string concatenation to produce SQL queries can present a risk of SQL injection attacks. As explained above, even if code principle violations do not directly give rise to a bug, they can increase the risk of a bug being introduced, raise security concerns, make debugging more problematic, and make software maintenance, update, and upgrade more time consuming and error prone.

Tools have been developed to assist developers in writing and debugging code. Even relatively simple code editors can include functionality that highlights certain keywords in a coding language in various colors, or can be used, for example, to identify matching grouping tokens (e.g., braces, brackets, parenthesis), or find unmatched grouping tokens. Other types of programs (or components of larger programs, such as a component of an integrated development environment) can serve as "code beautifiers," such as by applying formatting rules to code. Formatting rules can include highlighting certain terms, applying an indentation pattern, applying a spacing pattern, etc. In some cases, tools can determine whether code has syntax or other errors, and can highlight and explain particular errors.

One problem with existing solutions for analyzing code principle violations is that they are limited the particular develop who is using a code editor or IDE, and particular code that is being written or edited. It can be difficult to analyze or track patterns of code principle violations, such as for a particular developer, a particular group of developers, a particular project, or the like.

The present disclosure provides technologies that assist in detecting and correcting code principle violations. Certain aspects of the disclosed technology facilitate analyzing code written by a particular developer, a particular group of developers, associated with a particular project, or having other characteristics. Analyzing code based on these characteristics can provide a number of benefits. For example, if particular developers are associated with an unusually large number of code principle violations, action can be taken to help improve future code development. Such action can include providing educational intervention to ensure the developers are aware of desired coding practices.

Another benefit that can be provided by analyzing code having particular characteristics is that it can identify code that should be reviewed and potentially revised to comply with desired coding practices. That is, code with a high number of violations can be flagged for review and revision. By conducting multiple analyses, the improvement or worsening of code over time can be tracked, which can determine whether any remedial measures have been sufficient, additional remedial action is needed, or to generally track software development progress.

In some cases, an analysis can be conducted on existing code. For example, a code analysis can be conducted on a most recent version of code, or a selected code version (e.g., code existing as of a particular date, within a particular date range, having a particular version identifier, etc.). In other cases, a code analysis can be conducted dynamically. For example, compliance with coding principles can be conducted in a dynamic, or "online" manner, and feedback provided to a developer or other user on a real-time basis.

Feedback can be provided in a number of formats, including summarizing code principle violations by developer, software package, or sub-package elements (e.g., individual objects, methods, classes, etc.).

In further aspects, an analysis can be conducted dynamically while code is being written or modified. If a code principle violation is detected (e.g., improper formatting, use of a deprecated statement, use of nested loops, failure to provide comments), a user can be prompted, such as by a popup or other message in a GUI, that a code principle violation may exist. The user can be provided with a description of the problem and, optionally, provided with a solution. In further cases, at least some code principle violations, such as formatting issues, can be automatically corrected as code is being written or edited.

In some cases, a portion of code can be code that is automatically generated, rather than being automatically written. For example, a program may include abstract data types that follow a similar pattern. Rather than manually creating each abstract data type definition, a "template" can be provided. For example, a user can be prompted to enter certain parameters (e.g., aliases for data members, a name for the abstract data type), and the code for the abstract data type can be constructed.

In at least some cases, including generated code in a code analysis can skew an analysis. For example, if the generated code includes code principle violations, those code principle violations may not be "fairly" attributed to an individual developer or a development team. Similarly, a large amount of "correct," generated code can obscure the fact that the manually written code includes a disproportionate amount of code principle violations. Accordingly, in at least some cases, the disclosed technologies can include a feature that allows generated code to be selectively included in, or excluded from, an analysis.

In the examples that follow, aspects of the present disclosure may be described with respect to the ABAP programming language, and frameworks and programming environments useable with ABAP. However, the disclosed technologies may be used with any computing language, and functionality added, removed, or altered as needed depending on the computing language. In addition, at least certain aspects are described using existing frameworks or programming environments. However, disclosed technologies can be adapted to work with other environments and frameworks, or can include independent functionality for performing functions provided by the environments and frameworks.

Example 2—Example Code Having Code Principle Violations

FIG. 1 provides an example code segment 100 that includes a number of issues that may violate various coding standards, and thus result in code principle violations. The code segment 100 can represent a portion of a function or method. In many cases, coding standards may require that comments be provided prior to the declaration 108 of the function or method. In the code segment 100 such comments are missing. Therefore, it may be difficult for someone to understand the operation of the function, including what inputs are required, and their format, what outputs are provided, and their format, or the general operations carried out by the function.

In some coding standards, it is at least preferred that loops not be nested, or at least not nested beyond a certain degree. However, the code segment 100 includes a loop 112a that has nested loops 112b, 112c, 112d. Note further than loop 112b include a conditional statement 116 that includes identical conditions 118a, 118b. A conditional statement that includes redundant conditions can violate at least certain coding standards.

A code block 122 for the conditional statement 116 illustrates another issue that may violate coding standards. Namely, the indentation of the code statements in block 122 is both internally inconsistent and inconsistent with indentation rules of typical coding standards (e.g., coding standards that use common indentation levels for different levels of nested statements).

Coding standards typically include provisions for error handling routines, such as that every "try" statement should be associated with a "catch" block. Code segment 100 includes a "try" statement 126, but does not include a corresponding "catch" block.

Coding standards often state that variable declarations should be included at the beginning of a code module (e.g., function or method). However, code segment 100 includes a variable declaration 130 well within the code segment 100.

Typically, for readability and other issues, coding standards state that a single code statement should be on each line. However, code segment 100 includes a single line with both code statement 134 and code statement 136.

An organization may have its own coding practices. For example, an organization may have certain types of statements or functions that become deprecated over time. Continued use of deprecated code can represent a code principle violation. To illustrate this, code segment 100 shows a call to an obsolete function call 140 to "obsolete_call."

Line 144 of code segment 100 illustrates additional problems that can arise with conditional statements. Namely, line 144 includes nested conditionals (that is, conditional statement 148 is a condition of conditional statement 146), and also includes a statement 150 that executes if the condition is met in the line 144. So, line 144 can violate a coding standard that indicates that conditional statements should not be used within a conditional statement, as well as a coding standard that indicates that only one code statement should be included in a line of code.

Line 154 illustrates another example of a variable being declared other than at the beginning of the code segment 100.

The code principle violations of code segment 100 are provided by way of illustration only. The disclosed technologies can be used to identify and report any desired code principle violation. Typically, check methods are created for each code principle violation to be identified. Although, it may be possible for a single check method to be written that analysis code for multiple types of code principle violations.

As will be further described, a code analysis can use a set of standard code tests, custom code tests, or a combination thereof. Or, a user may be allowed to select or deselect particular tests to run, or to view results of fewer tests than were actually performed. Further, a user may be allowed to set parameters for various tests, or create test variants.

In some cases, a user may be equally interested in all types of code principle violations. In other cases, some code principle violations may be considered more or less problematic than other types of violations. Accordingly, tests can be assigned qualitative rankings (e.g., "high," "medium," "low" severity), rather than, or in addition to, providing quantitative results (e.g., a number of issues of each type, where a number of issues can also be correlated with a qualitative ranking, such as <5 being "low," >5 and <15 being "medium," and >15 being "high").

Example of tests that can be performed, and in at least some cases characterized as of being "high" importance, include, without limitation:

- Unit tests defined for various code segments or modules (e.g., an abstract data type, collection of abstract data types, functional unit of multiple code modules, etc.);
- Proper handling of errors and execution status messages (e.g., return values provided by SY-SUBRC in ABAP);
- Specifying a position for appending entries to a data structure (e.g., in ABAP, appending entries to a SORTED TABLE);
- Use of code parsers (e.g., in ABAP, the recursive non-descent, RND, parser), as different parsers may accept and reject different code, which can lead to unexpected behavior if code is accepted by one parser and not accepted by another;
- Global data processing statements (e.g., in ABAP, use of FOR ALL ENTRIES), which, for example, can cause issues if executed against an empty table;
- Nonterminating loops or loops with no statements inside a SELECT . . . END SELECT loop;
- Statements that do not use results of data processing statements (e.g., in ABAP, SELECT-statement with subsequent CHECK statement, where the SELECTED data is discarded for a subsequent CHECK);
- Statements within loops that result in excessive data processing (e.g., such as compared with processing the data after the loop, such as, in ABAP, having a SORT statement inside a loop);
- Number of statements per code module>50;
- Maximum statement nesting depth>5;
- Cyclomatic complexity>10, where cyclomatic complexity measures program complexity using a control flow graph;
- Number of methods per object>25;
- Number of attributes per object>10;
- Number of interfaces per object>5;
- Number of events per object>5;
- Number of redefined methods>25;
- SELECT statement in a loop—any occurrence.

Examples of tests that can be considered "medium" importance include, without limitation:

- Empty, unused procedur—any occurrence;
- Number of nested loops>0;
- EXIT or no statement in SELECT . . . END SELECT loop—any occurrence;
- Copy current table row for LOOP AT—any occurrence, as this can result in excessive data copying, where the statement can be rewritten in a way that avoids such copying;
- Slow parameter passing—any occurrence, such as determining whether a parameter passed by value could instead be passed by reference, or not passed;
- Copy large data objects—any occurrence, including determining whether a table has a row that includes table types (e.g., tables are nested) or determining whether a size of a copied object exceeds a threshold.

Examples of tests that can be considered "low" importance include, without limitation:

- Table attributes check
- any occurrence.

Regarding the above-described tests, unit tests can be tests written for a particular software domain or module. In at least some cases, unit tests can be written as local classes. As unit tests are typically automated, they are typically subject to certain constraints. For example, unit tests typically should be able to execute without user interaction. Thus, a check method for unit tests can analyze unit test code to determine if the unit test code includes statements that provide output intended for a user or which are configured to receive user input. Unit tests also typically should have limited operational effect, such as not leaving an executing program. Accordingly, a test method can scan code to determine wither a "LEAVE PROGRAM" or "SUBMIT<report>" statement is included in a test class.

In at least some cases, unit tests can be automatically generated, at least in part. For example, a shell local class may be created in some circumstances, where a user is expected to complete the code used for testing. A test method can determine whether a local class, such as a test class for a unit test, has a missing implementation.

Regarding appending entries to sorted tables, commands such as APPEND or INSERT can be used in conjunction with INDEX to insert entries into sorted tables. However, errors can arise if the sort order is not maintained (e.g., another process expects sorted data and receives instead unsorted data).

In some cases, violations of coding principles are identified, and a user may choose to take action to correct issues, corrective actions may be suggested (e.g., remedial actions may be suggested to conform with coding standards, such how to correct formatting, how to rewrite code to better comply with accepted coding practice, such as the use of alternative statements, or issues can be flagged for review that may be problematic, but may also be acceptable in at least certain circumstances), or corrective actions can automatically be taken (e.g., a code beautifier can be applied to correct formatting issues, statements can be automatically replaced with statements that comply with coding standards, and which, at least typically, provide equivalent functionality to the replaced code).

Example 3—Example Computing Environment for Performing Code Analysis

Figure 2:
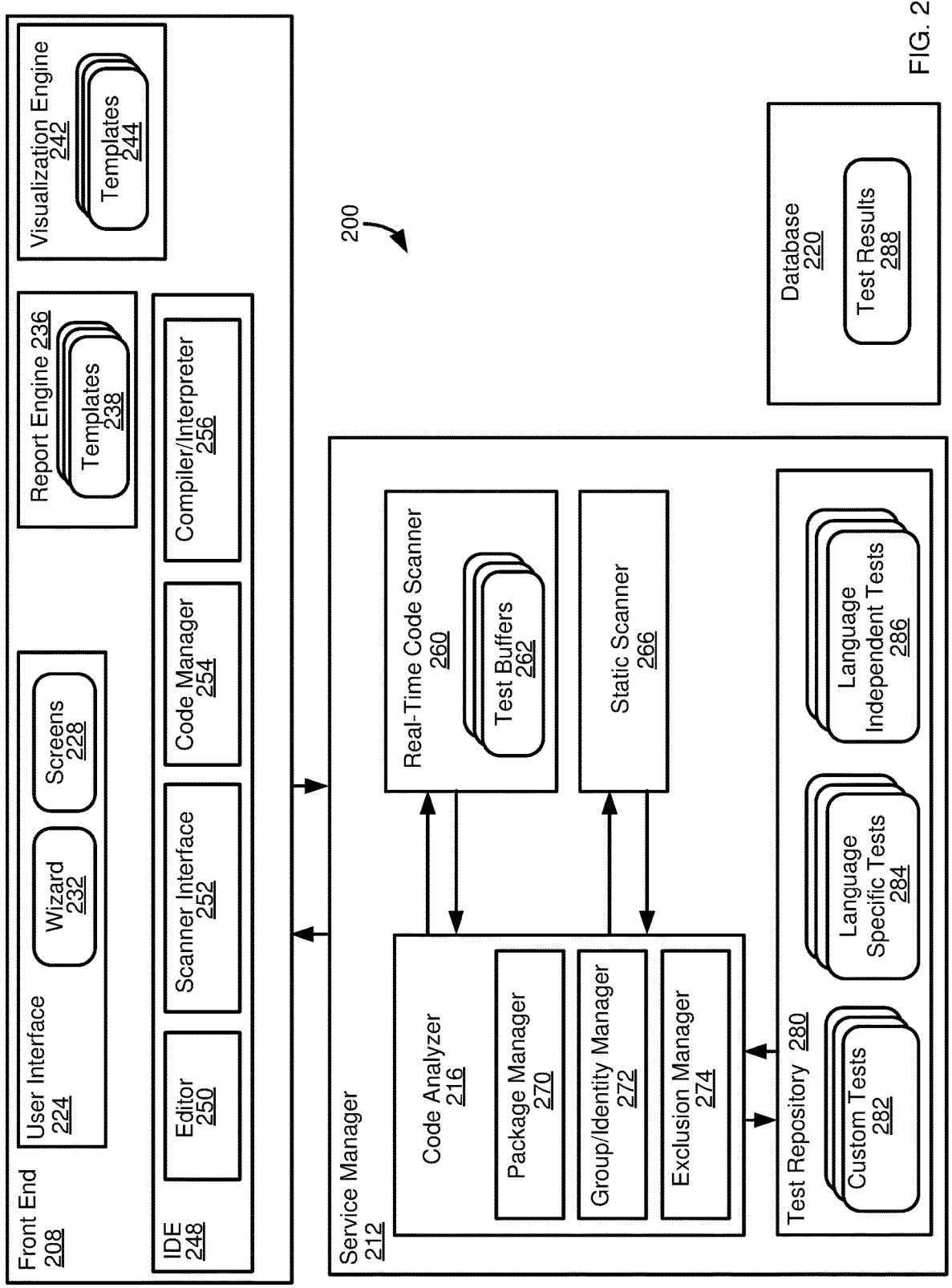
FIG. 2 is a block diagram of an example computing environment in which disclosed technologies can be implemented.

FIG. 2 illustrates a computing environment 200 in which disclosed technologies can be implemented. The computing environment 200 includes a front end 208, which can also serve as, or interact with, a client system (e.g., hosting an application that can be accessed by a user, or other applications, such as via an API, RFC, REST protocol, etc., to perform dynamic or static code analysis). The front end 208 can communicate with a service manager 212, which can include a code analyzer 216 that performs or coordinates various code analysis operations provided by the disclosed technologies. The computing environment 200 can include additional components, such as a database 220, which can be in communication with other components of the computing environment, such as the front end 208 and the service manager 212.

The front end 208 can include a user interface 224. The user interface 224 can provide screens 228 that allow a user to interact with functionality of the service manager 212. For example, the screens 228 can allow a user to specify code to be analyzed, to set analysis or configuration options, or to view and interact with analysis results. The user interface 224 can further include a wizard 232 (or multiple wizards, to facilitate different functions) for guiding a user through a code analysis (e.g., selecting code to be analyzed, setting analysis options, presenting analysis results, and optionally facilitating corrective action).

The user interface 224 can access reporting functionality, such as that provided by a report engine 236. The report engine 236 can include one or more report templates 238 for displaying or otherwise outputting analysis results. Similarly, the user interface 224 can access visualization functionality, such as that provided by a visualization engine 242. The visualization engine 242 can include one or more visualization templates 244 for displaying analysis results, which displays may be interactive in nature. Visualization and reporting options are further described in Examples 6-9.

The front end 208 can include an integrated development environment (IDE) 248, or a component that includes at least certain functions typically associated with an IDE. The IDE 248 can include a code editor 250. The code editor 250 can assist a user in creating and editing code, including identifying syntax errors, highlighting certain types of keywords (e.g., reserved words in a particular programming language), and, in at least some cases, assisting with formatting or applying other code beautification routines.

The IDE 248 can include a scanner interface 252, which can mediate access to the service manager 212, such as for facilitating dynamic code scanning, as will be further described, or for facilitating access to stored code. The IDE 248 can also include a code manager 254. The code manager 254 can be responsible for tracking code versions and code changes, enforcing security restrictions (e.g., who is authorized to access or edit particular code), and code assignments (e.g., developers assigned to particular projects associated with particular code). The IDE 248 can include a compiler/interpreter component 256 that can be used to compile or interpret code in various programming languages supported by the IDE.

As described above, the service manager 212 can include a code analyzer 216. The code analyzer 216 can mediate access to a real-time code scanner 260 and a static code scanner 266. The real-time code scanner 260 can scan code being entered in the editor 250 of the IDE 248 to determine whether any code policy violations have occurred, and to make any corrections or suggestions if a violation is detected.

The real-time code scanner 260 can maintain one or more buffers 262 (typically in-memory, but all or a portion of a buffer may be stored in persistent storage) for one or more tests. For example, the buffers 262 can maintain counts of nesting levels, stacks of tokens entered, etc. to determine where a code principle violation may have occurred. As tokens are input, side in the code editor 250, at least a portion of the tokens can be placed in a buffer 262, which can be used in analyzing code principle violations. For instance, the buffer 262 can track statements that begin a loop, and tokens that close a loop, to determine whether loops are nested. The buffers 262 can be, or can include, one or more data structures, such as stacks, queues, lists, heaps, trees, or graphs.

The static code scanner 266 can execute routines for tests to be executed against stored code to detect various code principle violations (e.g., a routine to detect nested loops, a routine to detect improper spacing, a routine to detected repeated code blocks). For example, the static code scanner 266 can carry out, or coordinate, activities such as retrieving an analysis type, retrieving tests associated with an analysis, retrieving code to be analyzed, and then executing tests against relevant code.

The code analyzer 216 can include a package manager 270 that includes functionality for determining code associations, such as code that is part of a common application, package, or other arrangement. As will be further explained, tracking relationships between code can be used to analyze compliance with coding principles at different levels of granularity, including by package, object, method, etc. Similarly, the code analyzer 216 can include a group/identity manager 272 that includes functionality for tracking code that is associated with a particular developer or group of developers. As will be further explained, tracking responsibility for code development can be used to analyze compliance with coding principles at various levels, from groups responsible for projects or project components to individual developers associated with particular project components, functional modules, etc.

The code analyzer 216 can further include a code exclusion manager 274. The code exclusion manager 274 can track code to be excluded from a code analysis, or to be included in a code analysis, but as flagged code. As described above, for example, in some cases, code may be generated automatically, in whole or part, by another program. It may be desirable to separate such code from manually written code, such as to avoid having manually written code look better by reducing a problem frequency or having manually written code look worse if any problems exist in the generated code. However, other types of code can be excluded from an analysis, such as code associated with a particular program, collection of programs, collection of program elements, program element, or code associated with one or more developers, including specifying a group of developers to be excluded from an analysis.

Generated code can be identified in any suitable manner. In some cases, certain types of code objects (e.g., classes, repository objects) can be associated with generated code. A ruleset or library can be used to track objects as, or having, generated code. In other cases, generated code objects can have metadata indicating that the code objects are generated. In other aspects, specific code blocks can be used to identify elements of generated code (e.g., a function or method name, or declaration, can be associated with generated code, where a code block following such identified code may also be flagged as generated code).

The service manager 212 can include a test repository 280. The test repository 280 can include various tests or analysis that can be run. The tests can be tests for use in a static analysis, in a dynamic analysis, or in either a static or dynamic analysis. The tests can include custom tests 282. Custom tests 282 can be tests that have been specifically designed or modified by a particular user or application. Tests can include language specific tests 284, which are tests that are specific to a particular programming language. For instance, even if a test seeks to identify an issue that may arise in multiple programming languages, that issue may manifest itself depending on if the programming language is ABAP, SQL, C++, JAVA, LISP, etc. Correspondingly, the tests can include language independent tests 286, which can be tests that can be executed regardless of programming language. For example, at least some formatting may be language independent (e.g., indention or spacing rules can be the same whether the programming language is JAVA or C++).

As will be further described, an analysis can be defined that includes one or more tests of the test repository 280, or is otherwise defined to include one or more tests. The analysis can be stored and retrieved when the analysis is to be executed. An analysis, or tests, including tests of the test repository 280, can be associated with an interpretation schema. The interpretation schema can define various rules that determine whether test results may result in a code principle violation. For example, a test may identify that five of a particular type of issue exist in particular code, but the test may or may not indicate whether five is a "good" or "bad" result. An interpretation schema can be used to map test results to qualitative descriptions, and, in at least some, cases map the results to educational materials that describe the problem or potential solutions, or map the results to corrective measures that may be automatically taken. Interpretation schemas can also be stored and, if desired, included in the definition of an analysis. That is, for example, an analysis may be defined as "use tests 1, 4, and 10, and interpret the results using interpretation schema A."

The database 220 can be used to store test results 288. Tests results 288 can be stored for use or analysis at a time after the test was run, including for use in reports or visualizations that track test results over time. For example, comparing results from multiple tests over a particular time period can indicate whether compliance with coding policies is improving or worsening.

Example 4—Example User Interface for Executing Code Principle Analysis

Figure 3:
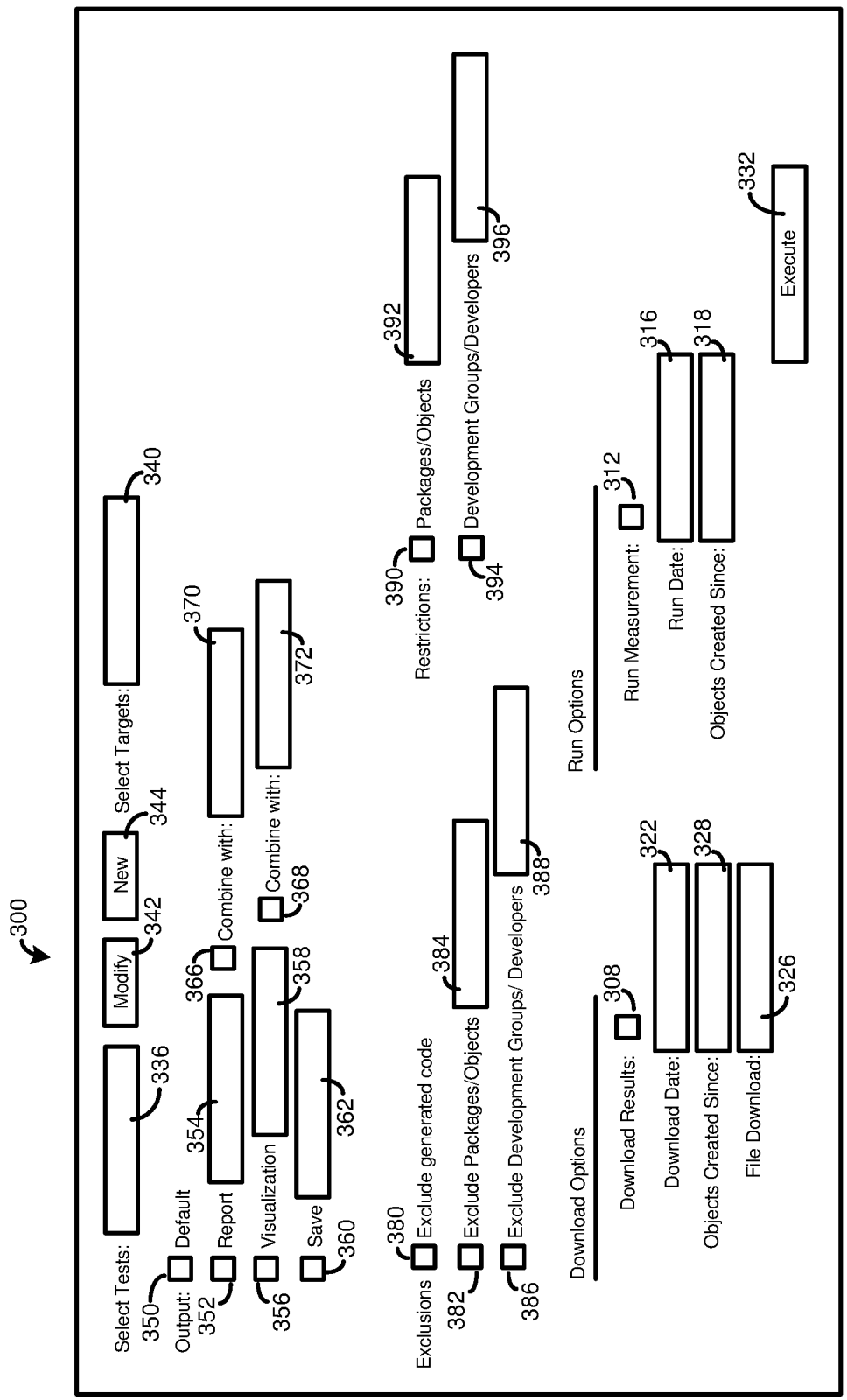
FIG. 3 is an example user interface screen for selecting options for executing a code analysis.

FIG. 3 illustrates an example user interface screen 300 that can be presented to a user to execute a code analysis. The user interface screen 300 can be one of the screens 228 of FIG. 2. The user interface screen 300 can include a selectable user interface element (e.g., radio button, check box) 308 for executing an analysis against stored code and a selectable user interface element 312 for executing an analysis against previous test results. That is, selection of user interface element 312 may be used to generate a report or visualization based on test results from a previously executed test, while selection of user interface element 308 can execute a new test and generate a report or visualization based on the results.

If a user selects to execute a new test, by selecting user interface element 308, a user can specify a date for the test to be run (e.g., the test can be scheduled) in field 316, and can select a date in field 318 that will limit the test to objects created (or, at least optionally, created or modified) after a certain date. For example, a user may wish to view a report of objects that are currently in a development or update process, as opposed to objects that may have been finalized.

Similarly, if a user selects user interface element 312 to run a report or visualization against prior results, a user can enter a date in field 322 to specify a particular date when test results were obtained, or specify a particular test result file in field 326. In field 328, a user can select a date that will limit the report or visualization to objects created (or optionally modified) after the date.

Once a user has selected the desired options, they can cause a report or visualization to be generated by selecting an execute button 332.

The screen 300 can present additional options, if desired. For example, a field 336 can be provided where a user can enter or select one or more tests to be executed against one or more particular targets (e.g., a repository location, package identifiers, etc.) provided in a field 340. A user may choose to modify a selected test by selecting a user interface element 342, or to create a new test by selecting a user interface element 344.

A variety of output options can be presented for a user to choose from. The output options can include a default selection 350, which can be a system default output type (e.g., a particular report format or visualization), or a default output type specified in a test selected using the field 336. Alternatively, the user may select a report user interface element 352, and provide a report name or type in field 354, select a visualization user interface element 356, and provide a visualization name or type in field 358, or may select a save user interface element 360, which can save results to a location specified in field 362. For the report user interface element 352 and the visualization user interface element 356, the user may be further provided with respective user interface elements 366, 368, which can be selected to indicate that the report or wizard should combine the execution results with prior execution results in generating the report or visualization. The prior respective reports or visualizations can be specified in respective fields 370, 372.

A user may be provided with options to exclude particular code from an analysis, or to restrict the analysis to particular code. For example, a user may be provided with a user interface icon 380 to exclude generated code, or a user interface icon 382 to exclude code elements (e.g., objects or packages) specified in a field 384. A user interface element 386 may be selected to exclude particular developers or groups of developers specified in a field 388.

In a similar manner, a user may select user interface element 390 to indicate that the analysis should be restricted to particular code (e.g., objects or packages) specified in a field 392. Or, a user can restrict the analysis to particular development groups/developers provided in a field 396 by selecting user interface element 394. In some cases, combinations of restrictions or exclusions may be specified, such as excluding generated code, particular code elements, and particular developers.

Example 5—Example User Interface to Define Code Analysis

Figure 4:
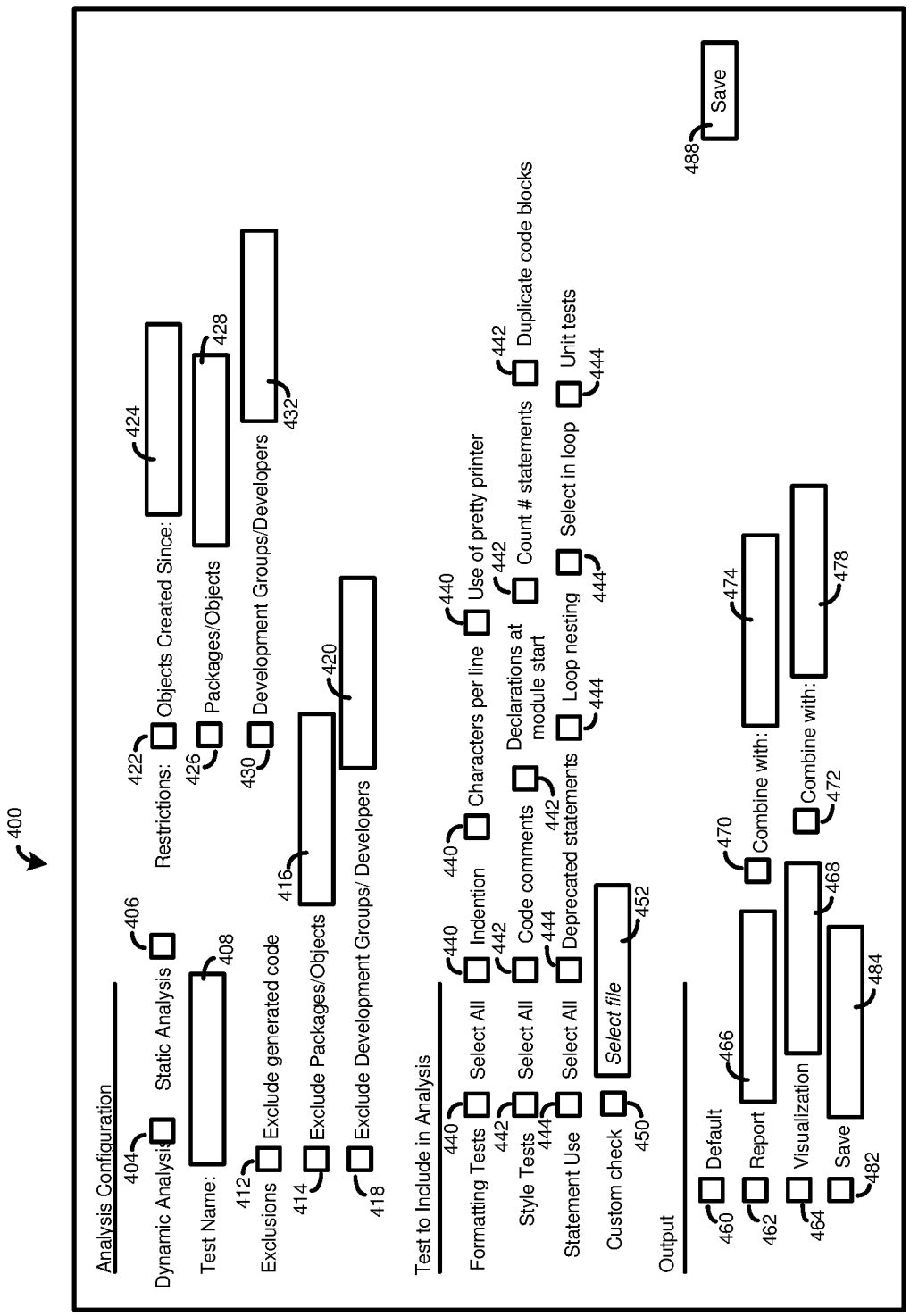
FIG. 4 is an example user interface screen for defining a code analysis.

FIG. 4 presents an example user interface screen 400 where a user can configure a particular analysis to be executed. The analysis can be a static analysis that will be executed against stored code, or can represent configuration options that will be used in a dynamic analysis of code being entered or modified by a user.

A user can specify whether the analysis is to be a dynamic analysis or a static analysis by selecting respective user interface elements 404, 406. In some cases, both user interface elements 404 and 406 can be selected. The user can provide a name or identifier for the analysis in a field 408.

In a similar manner as described with respect to FIG. 3, a user can specify particular code that will be excluded from an analysis, or restrict the analysis to particular code. The screen 400 can present a user interface icon 412 to exclude generated code, a user interface icon 414 to exclude code specified in a field 416, and a user interface icon 418 to exclude developers or groups of developers specified in a field 420. The screen 400 can present a user interface icon 422 to restrict the analysis to objects created after a particular date (or, alternatively, a date range) specified in a field 424, a user interface icon 426 to restrict the analysis to particular code specified in a field 428, and a user interface icon 430 to restrict the analysis to code associated with particular developers or development groups provided in a field 432.

The screen 400 can present a user with various analysis types that can be performed as part of the analysis being defined. The tests can test for particular violations of coding standards. In some cases, the test types can be grouped, such as having user interface elements 440 for various formatting tests (e.g., indention, characters per line, use of code beautifiers), user interface elements 442 for various style tests (e.g., checking for commented code, having variables declared at the start of a program module, the number of statements in a program module, and checks for duplicate code blocks), and user interface elements 444 for various types of statement usage (e.g., use of deprecated statements, checks for nested loops, checks for select statements in a loop, or tests specified for software units, such as ABAP unit tests). A user thus may be able to define their own collection of tests by selecting from user interface elements 440, 442, 444. A user may be able to add custom checks to the test by selecting a user interface element 450 and providing an identifier for the check in field 452.

In a similar manner as described with respect to FIG. 3, a particular type of output format can be defined for the analysis. The output type can be a required output type, or can represent a default output type if no output type is selected (or the default type is selected) via the screen 400. The user may be able to select the output type as a default type (e.g., a system or application specified default type) via user interface element 460. A user can specify that the output should be a report or a visualization via respective user interface elements 462, 464 and entering a report or visualization identifier, respectively, in field 466 or 468. Optionally, by selecting user interface elements 470, 472, the user can specify that current analysis results should be combined with prior analysis results specified via fields 474, 478. The user can specify via user interface element 482 that analysis results will be saved to a location specified in field 484.

The user can save the analysis definition by selecting the save user interface element 488.

Example 6—Example User Interface to Define Interpretation Schema

Figure 5:
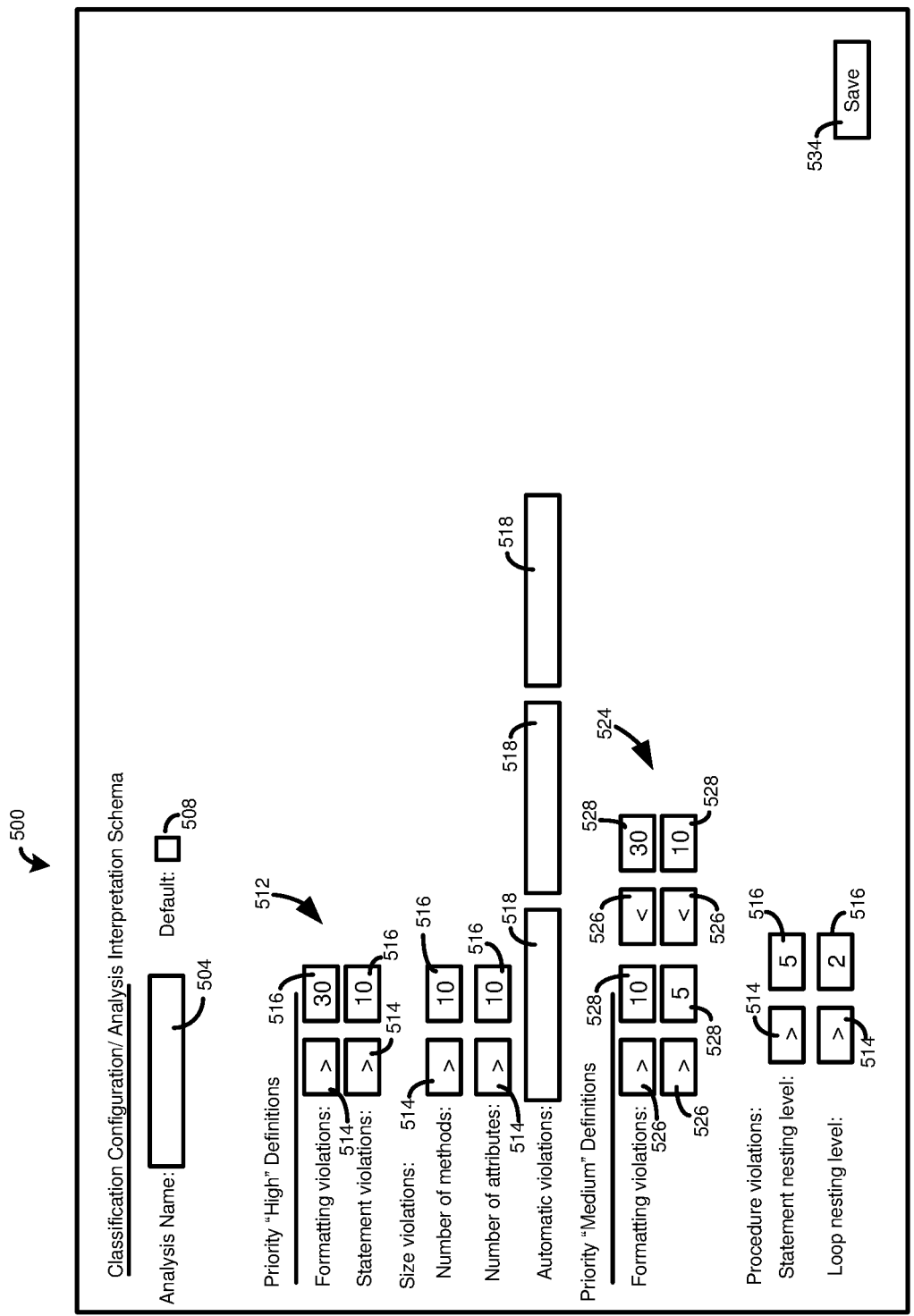
FIG. 5 is an example user interface screen for defining a classification schema for results of a code analysis.

FIG. 5 is an example user interface screen 500 by which a user can define analysis results, such as in the form of an interpretation schema. That is, for example, the user can create rules that can be used to determine whether results of a code analysis indicate a problem, and the degree of a problem.

In field 504, a user can provide a name of an analysis to which the rules provided via the screen 500 will apply. Or, the user can select user interface element 508 to indicate that the rules are default rules for code analyses (at least with respect to a particular computing system, application instance, user configuration setting, etc.).

Section 512 of the screen 500 lists criteria that qualify as "high" violations. As shown, section 512 provides entry fields 514 by which a user can select an operator (e.g., greater than, less than) and fields 516 for numerical values against which the operators in the fields 512 will be evaluated. As shown, the section 512 includes fields 514, 516 for formatting violations, statement violations, and for particular types of size violations—such as a number of methods and a number of attributes. Using fields 518, a user can specify statements or other issues that are automatically classified as "high" priority violations.

Similarly, section 524 of the screen 500 lists criteria that qualify as "medium" violations. Section 524 includes two sets of operator fields 526 and two sets of numerical fields 528 by which a user can define a range of values that will result in "medium" violations. The use of the fields 526, 528 can otherwise be similar to the fields 514, 516. Section 524 includes operator and value fields 514, 516 for particular types of procedural violations, namely statement nesting level and loop nesting level.

A user can save the rule set by selecting a save icon 534.

Example 7—Example Analysis Results

FIG. 6 provides example results 600 of a code analysis. FIG. 6 can represent a report format. The results 600 are presented in tabular format, and are broken down by development unit 608, where a development unit can represent a particular application or application component, or a particular group of developers (who, in turn, may be responsible for particular applications or application components). For each development unit 608, the table of the results 600 lists a total number of issues 612 that were identified in the code analysis. In the results 600, issues are not separated by severity or other classification (e.g., "high," "medium," "low") or type (e.g., "formatting," "statement").

As explained, in some cases it may be desirable to understand code analysis results without the inclusion of certain code, such as generated code. In the results 600, for each development unit 608, the number of issues without considering generated code 616 are provided. Similarly, for each development unit 608, the results 600 can list the total number of statements 620, the total number of statements corresponding to generated code 624, and the total number of statements that are not generated code 628. The number of issues that do not arise from generated code 616 and the number of statements that do not correspond to generated code 628 can be used (e.g., by dividing 616 by 628) to provide a bad code percentage 632, which can in turn be used (e.g., by subtracting it from 100) to provide a clean code percentage 636.

From the results 600, it can be seen that development unit SI has a much higher percentage of bad code than the other development units. Accordingly, the results 600 can be used to determine that remedial measures may need to be taken with respect to development unit SI, which could include revising the code or providing education or training to developers associated with unit SI. By periodically generating new results 600, it can be determined whether the performance of the development units 608 is improving or worsening, and action taken accordingly.

Example 8—Example Analysis Results Showing Development Unit and Package

FIG. 7 presents results 700 that are in a tabular format similar to the results 600. However, the results 700 are broken down by both development unit 708 and APO 712 (area product owner—a developer or manager responsible for multiple software programs or components in a particular functional area). Otherwise, the results 700 are similar to the results 600, providing a total number issues identified 716, a total number of issues if generated code is not included 720, a total number of statements 724 (in the particular object 712 associated with a particular development unit 708), a total number of generated statements 728, a total number of non-generated statements 732, a clean code percentage 736, and a bad code percentage 740.

The results 700 can be beneficial in that they can help identify particular programmatic objects that have issues, so that the code can be cleaned, and so the responsible developers can receive education or training to reduce the frequency of future issues.

Example 9—Example Analysis Results Showing Development Unit, Package, and Programmatic Object FIG. 8 presents results 800 that are in a tabular format similar to the results 600 and the results 700. However, the results 800 are presented for a single development unit 808, and are broken down by both package 810 and programmatic object 812 within a package. Otherwise, the results 800 are similar to the results 600, 700, providing a total number issues identified 816, a total number of issues if generated code is not included 820, a total number of statements 824 (in the particular object 812 associated with a particular development unit 808), a total number of generated statements 828, a total number of non-generated statements 832, a clean code percentage 836, and a bad code percentage 840.

The packages 810 and objects 812 can be associated with an APO 844 (area product owner a developer or manager responsible for multiple software programs or components in a particular functional area). Packages 810 and objects 812 can also be associated with a PO 848 (product owner—a developer or manager responsible for a particular software program or component).

The results 800 can be beneficial in that they can help identify particular programmatic objects that have issues at a more granular level, so that the code can be cleaned, and so that the responsible developers can receive education or training to reduce the frequency of future issues.

Example 10—Example Analysis Results with Individual Check Results

FIG. 9 presents results 900 that are in a tabular format similar to the results 600 and the results 700. However, rather than providing a total number of issues and clean code/bad code percentage, the results 900 list frequency of occurrence values 908 for specific issues 912 that were tested for in a particular analysis. The values 908 are grouped by product owner 920, and further by package 924 and by objects 928 within the particular package.

The results 900 can be beneficial in that they can help identify specific issues in particular programmatic objects, which can facilitate code cleaning, as well as provide direction for education and training efforts.

While Examples 6-10 provide example visualizations or report formats listing identified code principle violations, a variety of other types of visualizations can be provided. For instance, a visualization can be provided that provides a line chart of information over a period of time, such as with x-axis data points associated with particular software versions or releases (optionally including a date), and y-axis data points associated with values such as a total number of statements, a total number of statements with code principle violations (or limited to generated or non-generated statements), a total number of statements with high priority code principle violations (or limited to generated or non-generated statements), a total number of statements with medium priority code principle violations (or limited to generated or non-generated statements), a total number of statements with no violations, a total number of generated code statements, a total number of non-generated code statements, etc. The y-axis can be provided with multiple scales, and thus can be used to display multiple lines on a single chart. Different line styles or other formatting (e.g., color) can be used to help distinguish between different lines of the line chart. Filtering options can be provided, such as to filter by unit (or display all units), a particular developer or group of developers (or all developers or all groups), depending on whether statements are generated or not, or to filter by software package or package object (or to display all packages, all objects in a package, or all objects from multiple objects).

Example 11—Example Test Definition

FIG. 10 presents a class specification 1000 for a particular test method that can be included in a code analysis. In particular, the test of the class specification 1000 tests for, and counts the number of, nested loops in program code.

FIGS. 11A-11E are example ABAP source code implementing certain methods of the class specification presented in FIG. 10.

FIG. 12A is example ABAP code implementing a constructor that enables additional test classes. FIG. 12B is example ABAP code for registering a new check method in a list of available checks for a code analyzer. FIG. 12C is example ABAP code for searching code for a particular string, which can be used in implementing a check method (e.g., for identifying code having a string that may correspond to a code principle violation).

Example 12—Example Code Analysis Operations

Figure 13:
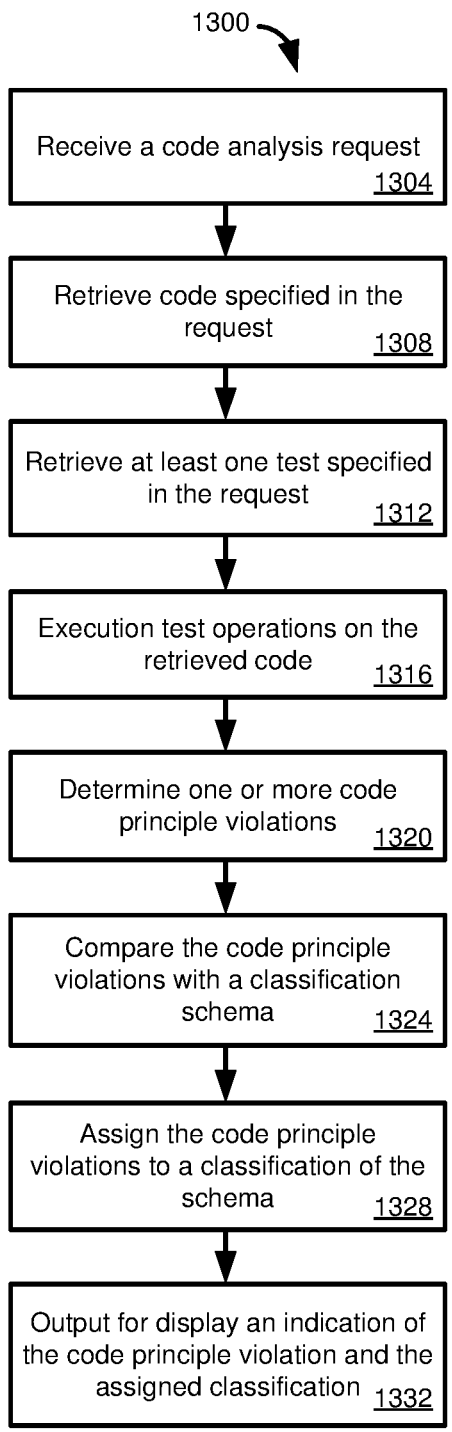
FIGS. 13-15 are flowcharts illustrating operations in conducting embodiments of a code analysis.

FIG. 13 is a flowchart of a method 1300 of analyzing source code to determine code principle violations. The method 1300 can be carried out, in some cases, using the computing environment 200 of FIG. 2. At 1304, a code analysis request is received. The code analysis request specifies code to be analyzed for code principle violations and an identifier of at least one test to be applied to the specified code. The specified code is retrieved at 1308. At 1312, the at least one test is retrieved. The at least one test specifies operations to detect one or more code principle violations. The operations are executed on the specified code at 1316.

At 1320, one or more code principle violations are determined in the specified code, during the executing. The one or more code principle violations are compared with a classification schema at 1324. The classification schema includes a plurality of classifications and criteria for meeting a classification of the plurality of classifications. At 1328, one or more code principle violations are associated with a classification of the classification schema. An indication is output for display, at 1332, of the one or more code principle violations and an association of the one or more code principle violations with the assigned classification.

Figure 14:
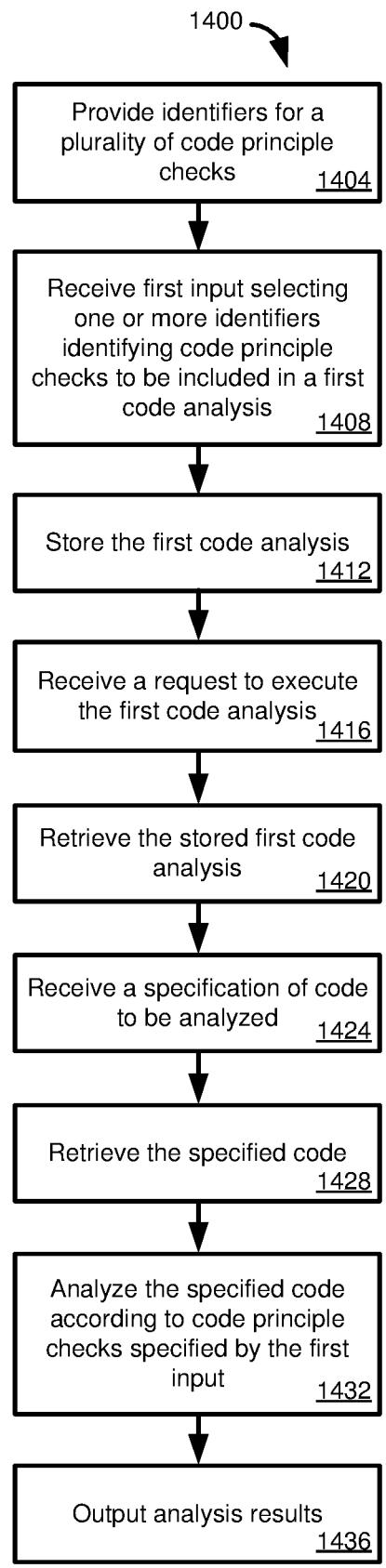

FIG. 14 is a flowchart of a method 1400 that can be carried out by a code analysis system. The method 1400 can be carried out, in some cases, using the computing environment 200 of FIG. 2. At 1404, identifiers are provided for a plurality of code principles checks that may be included in a code analysis. First input is received, at 1408, selecting one or more identifiers identifying code principle checks to be included in a first code analysis. The first code analysis is stored at 1412. At 1416, a request is received to execute the first code analysis. The stored first code analysis is retrieved at 1420. A specification of code to be analyzed using the first code analysis is received at 1424. The specified code is retrieved at 1428. At 1432, at least a portion of the specified code is analyzed according to code principle checks indicated by the first input to generate analysis results. The analysis results are output for display at 1436.

Figure 15:
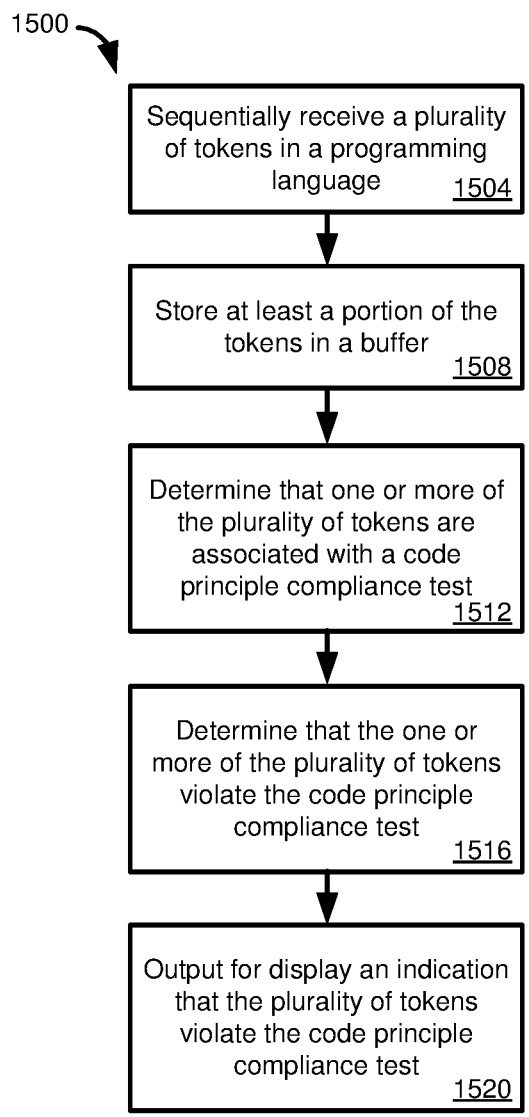

FIG. 15 is a flowchart of a method 1500 that can be carried out to perform a code analysis, such as a dynamic, or online analysis. The method 1500 can be carried out, in some cases, using the computing environment 200 of FIG. 2. At 1504, a plurality of tokens in a programming language are sequentially received. At least a portion of the plurality of tokens are stored in a buffer at 1508. At 1512, it is determined that one or more of the plurality of tokens are associated with a code principle compliance test. It is determined at 1516 that one or more of the plurality of tokens violate the code principle compliance test. At 1520, an indication is output for display that the plurality of tokens violate the code principle compliance test.

Example 13—Computing Systems

Figure 16:
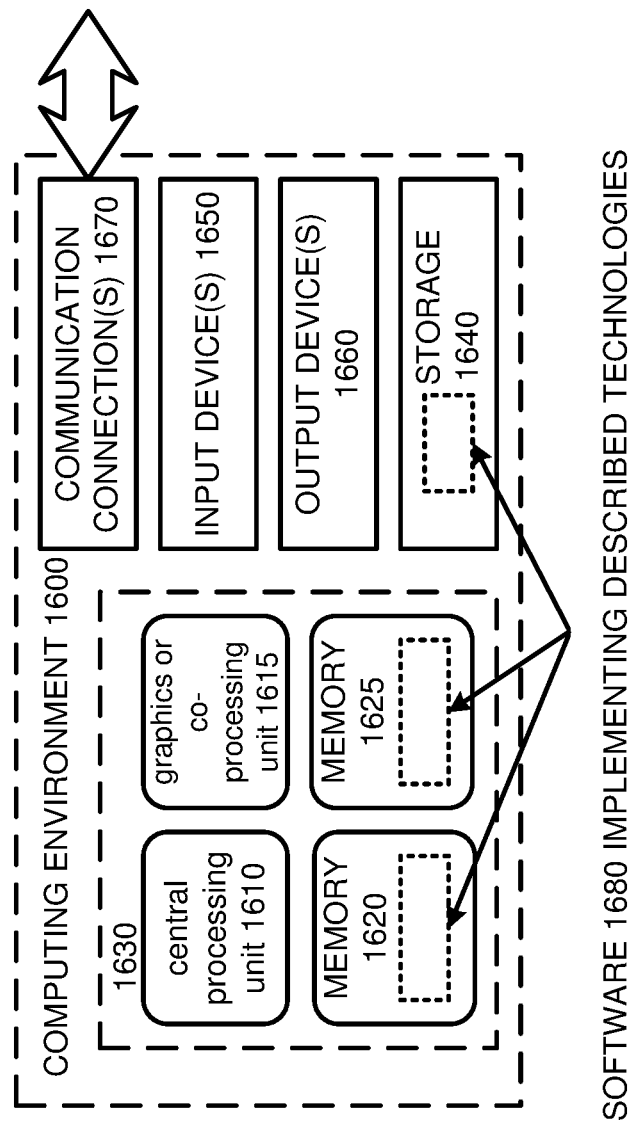
FIG. 16 is a diagram of an example computing system in which some described embodiments can be implemented.

FIG. 16 depicts a generalized example of a suitable computing system 1600 in which the described innovations may be implemented. The computing system 1600 is not intended to suggest any limitation as to scope of use or functionality of the present disclosure, as the innovations may be implemented in diverse general-purpose or special-purpose computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 execute computer-executable instructions, such as for implementing components of the architecture 200 of FIG. 2, including as further described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 may be volatile memory (e.g., registers, cache, RAM), non-volatile memory (e.g., ROM, EEPROM, flash memory, etc.), or some combination of the two, accessible by the processing unit(s) 1610, 1615. The memory 1620, 1625 stores software 1680 implementing one or more innovations described herein, in the form of computer-executable instructions suitable for execution by the processing unit(s) 1610, 1615.

A computing system 1600 may have additional features. For example, the computing system 1600 includes storage 1640, one or more input devices 1650, one or more output devices 1660, and one or more communication connections 1670. An interconnection mechanism (not shown) such as a bus, controller, or network interconnects the components of the computing system 1600. Typically, operating system software (not shown) provides an operating environment for other software executing in the computing system 1600, and coordinates activities of the components of the computing system 1600.

The tangible storage 1640 may be removable or non-removable, and includes magnetic disks, magnetic tapes or cassettes, CD-ROMs, DVDs, or any other medium which can be used to store information in a non-transitory way and which can be accessed within the computing system 1600. The storage 1640 stores instructions for the software 1680 implementing one or more innovations described herein.

The input device(s) 1650 may be a touch input device such as a keyboard, mouse, pen, or trackball, a voice input device, a scanning device, or another device that provides input to the computing system 1600. The output device(s) 1660 may be a display, printer, speaker, CD-writer, or another device that provides output from the computing system 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 17:
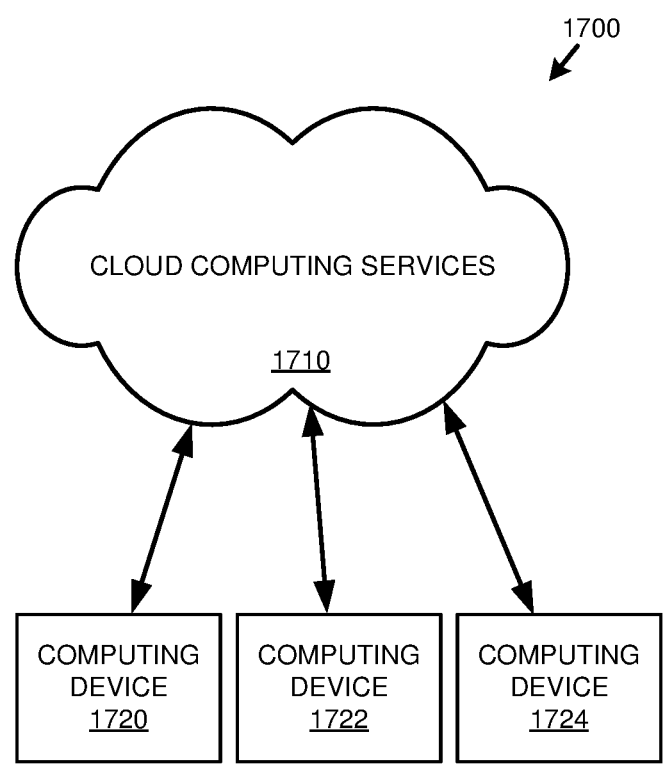
FIG. 17 is an example cloud computing environment that can be used in conjunction with the technologies described herein.

FIG. 17 depicts an example cloud computing environment 1700 in which the described technologies can be implemented. The cloud computing environment 1700 comprises cloud computing services 1710. The cloud computing services 1710 can comprise various types of cloud computing resources, such as computer servers, data storage repositories, networking resources, etc. The cloud computing services 1710 can be centrally located (e.g., provided by a data center of a business or organization) or distributed (e.g., provided by various computing resources located at different locations, such as different data centers and/or located in different cities or countries). The cloud computing services 1710 are utilized by various types of computing devices (e.g., client computing devices), such as computing devices 1720, 1722, and 1724. For example, the computing devices (e.g., 1720, 1722, and 1724) can be computers (e.g., desktop or laptop computers), mobile devices (e.g., tablet computers or smart phones), or other types of computing devices. For example, the computing devices (e.g., 1720, 1722, and 1724) can utilize the cloud computing services 1710 to perform computing operators (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 16, computer-readable storage media include memory 1620 and 1625, and storage 1640. The term computer-readable storage media does not include signals and carrier waves. In addition, the term computer-readable storage media does not include communication connections (e.g., 1670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising a memory and one or more processors, comprising:
   receiving a code analysis request from a user, the code analysis request comprising user input specifying (1) at least one code identifier specifying code to be analyzed for code principle violations; and (2) an identifier of at least one test to be applied to the code;
   at a first time, executing a set of operations comprising:
      (1) retrieving code specified by the at least one code identifier, the code comprising a plurality of objects;
      (2) retrieving at least one test specified by the identifier, the at least one test specifying operations to detect one or more code principle violations;
      (3) executing the operations of the at least one test on the code;
      (4) determining one or more code principle violations in the code during the executing;
      (5) determining a number of lines of code analyzed for code principle violations of the one or more code principle violations; and
      (6) determining a number of lines of code determined to have code principle violations;
   for multiple objects of the plurality of objects, outputting for display a first indicator of a percentage of error free code or a first indicator of a percentage of error containing code;
   carrying out the set of operations at a second time, the second time being different than the first time; and
   outputting for display a comparison of test results at the first time and test results at the second time, wherein the outputting for display of a comparison of test results comprises displaying a second indicator of a second percentage of error free code at the second time or a second indicator of a percentage of error containing code at the second time.

2. The method of claim 1, wherein the at least one test determines whether commenting of the code complies with a commenting policy.

3. The method of claim 1, wherein the at least one test detects nested loops in the code.

4. The method of claim 1, further comprising:
determining identities of one or more developers or development groups responsible for creating the code, wherein the outputting for display a first indicator of a percentage of error free code or a first indicator of a percentage of error containing code comprises displaying a percentage of error free code or a percentage of error-containing code for developers or development groups, of the one or more developers or development groups, associated with the code for given objects of the plurality of objects.

5. The method of claim 1, further comprising:
receiving a specification of a portion of the code to be excluded from at least (3)-(6) of the set of operations.

6. The method of claim 5, wherein the portion of the code comprises code automatically generated by a software program.

7. The method of claim 1, wherein the code analysis request specifies a date range for the code, wherein stored code not complying with the date range is excluded from at least (3)-(6) of the set of operations.

8. The method of claim 1, further comprising:
determining remedial information to be displayed and corresponding to at least one code principle violation of the one or more code principle violations, wherein the remedial information provides an explanation of the at least one code principle violation or an explanation of actions to correct the at least one code principle violation; and
outputting the remedial information for display.

9. The method of claim 1, wherein the executing operations of the at least one test on the code comprises:
sequentially receiving a plurality of tokens of a programming language; and
storing at least a portion of the plurality of tokens in a buffer; and
wherein the determining one or more code principle violations comprises determining that one or more tokens of the plurality of tokens violate a code principle violation of the one or more code principle violations.

10. A computing system comprising:
at least one memory;
one or more processing units coupled to the at least one memory; and
one or more computer readable storage media storing instructions that, when executed, cause the one or more processing units to perform operations comprising:
rendering for display a user interface screen providing identifiers for a plurality of code principle checks that may be included in a code analysis;
receiving through the user interface screen first input selecting one or more identifiers identifying code principle checks of the plurality of code principle checks to be included in a first code analysis;
storing the first code analysis to provide a stored first code analysis;
at a first time, receiving a first request to execute the first code analysis;
in response to the receiving the first request, performing a set of operations comprising:
retrieving the stored first code analysis;
receiving a specification of code to be analyzed using the first code analysis;
retrieving code specified by the specification of code;
analyzing at least a portion of the code according to code principle checks indicated by the first input to generate analysis results;
determining a number of lines of code analyzed for code principle violations; and
determining a number of lines of code determined to have code principles violations;
outputting for display the analysis results, the analysis results comprising a first indicator of a percentage of error free code or a first indicator of a percentage of error containing code;
at a second time, the second time being different than the first time, receiving a second request to execute the first code analysis;
in response to the receiving the second request, performing the set of operations; and
outputting for display a comparison of test results at the first time and test results at the second time, wherein the outputting for display a comparison of test results comprises displaying a second indicator of a percentage of error free code at the second time or a second indicator of a percentage of error containing code at the second time.

11. The computing system of claim 10, the operations further comprising:
retrieving a classification schema, wherein the classification schema specifies a plurality of classification categories and criteria for a code principle check being assigned to a classification category of the plurality of classification categories.

12. The computing system of claim 10, wherein the plurality of code principle checks comprise formatting checks and statement checks.

13. The computing system of claim 10, the rendering further comprising displaying a user interface control selectable by a user to indicate whether generated code will be excluded from the first code analysis.

14. The computing system of claim 10, the operations further comprising:
rendering for display one or more user interface controls operable by a user to provide user input defining threshold criteria for one or more code principle checks of the plurality of code principle checks, wherein the analyzing indicates that the code satisfies threshold criteria for a code principle check of the plurality of code principle checks and the analyzing correspondingly determines that an associated line of code of the code has a code principle violation.

15. The computing system of claim 10, wherein the analyzing at least a portion of the code comprises:
sequentially receiving a plurality of tokens of a programming language;
storing at least a portion of the plurality of tokens in a buffer; and
determining that one or more of the plurality of tokens are associated with a code principle check of the plurality of code principle checks; and
wherein the analyzing comprising analyzing the plurality of tokens.

16. A computing system comprising:
at least one memory;
one or more processing units coupled to the at least one memory; and
one or more computer readable storage media storing instructions that, when executed, cause the one or more processing units to perform operations comprising:
executing a first code analysis by executing a set of operations comprising:
sequentially receiving a plurality of tokens of a programming language for code specified for a code analysis comprising a plurality of code principle compliance tests, the plurality of tokens comprising one or more tokens defining a plurality of loops;

storing at least a portion of the plurality of tokens in a buffer;

determining that one or more tokens of the plurality of tokens are associated with a code principle compliance test of the plurality of code principle compliance tests;

determining that at least a portion of the plurality of loops are nested with a nesting level;

determining that the one or more tokens of the plurality of tokens violate the code principle compliance test, including by determining that the nesting level satisfies a threshold;

determining a number of lines of code analyzed for code principle violations;

determining a number of lines of code determined to have code principles violations; and outputting for display an indicator of a percentage of error free code or an indicator of a percentage of error containing code resulting from the first code analysis.

17. The computing system of claim 16, where the operations further comprise:

rendering for display a user interface screen providing identifiers for the plurality of code principle compliance tests; and receiving through the user interface screen first user input selecting the identifiers, the first user input indicating that the code principle compliance tests will be included in the first code analysis.

18. The computing system of claim 17, wherein one or more identifiers of the identifiers for the plurality of the code principle compliance tests are associated with a type selected from the group consisting of formatting tests, style tests, and statement checks.

19. The computing system of claim 16, wherein the first code analysis is executed at a first time, the operations further comprising:

executing a second code analysis at a second time, the second time being different than the first time, by executing the set of operations; and outputting for display a comparison of test results at the first time and test results at the second time.

20. The computing system of claim 19, wherein the indicator of a percentage of error free code or the indicator of a percentage of error containing code is a first indicator for the first time and the comparison of test results comprises a second indictor for the second time, the second indicator being of a percentage of error free code or a percentage of error containing code at the second time.

* * * * *